United States Patent
Satoh

(10) Patent No.: US 8,902,441 B2
(45) Date of Patent: Dec. 2, 2014

(54) IMAGE FORMING APPARATUS, NETWORK PRINTING SYSTEM, POWER SAVE CONTROL METHOD, AND POWER SAVE CONTROL PROGRAM, AND STORAGE MEDIUM

(71) Applicant: Takeya Satoh, Tokyo (JP)

(72) Inventor: Takeya Satoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/785,065

(22) Filed: Mar. 5, 2013

(65) Prior Publication Data

US 2013/0250329 A1 Sep. 26, 2013

(30) Foreign Application Priority Data

Mar. 22, 2012 (JP) ................................. 2012-064746

(51) Int. Cl.
*G06F 3/12* (2006.01)

(52) U.S. Cl.
CPC .......... *G06F 3/1221* (2013.01); *Y02B 60/1271* (2013.01); *Y02B 60/1267* (2013.01); *G06F 3/1291* (2013.01); *G06F 3/126* (2013.01)
USPC .......................................... 358/1.13; 358/1.1

(58) Field of Classification Search
None
See application file for complete search history.

(56) References Cited

U.S. PATENT DOCUMENTS

2010/0014114 A1* 1/2010 Oosawa ....................... 358/1.15

FOREIGN PATENT DOCUMENTS

| JP | 2005-205830 | 8/2005 |
|---|---|---|
| JP | 2010-003083 | 1/2010 |

* cited by examiner

*Primary Examiner* — Marcus T Riley
(74) *Attorney, Agent, or Firm* — Cooper & Dunham LLP

(57) ABSTRACT

A plurality of image forming apparatuses is connectable to a plurality of host apparatuses via a network. The image forming apparatus includes an apparatus information collection unit to obtain print history and function information as apparatus information of each image forming apparatus; a priority order determination unit to determine a priority order for setting a master image forming apparatus; a master determination unit to determine an image forming apparatus among the currently operating image forming apparatuses; a host information collection unit to collect print history and current print settings as host information of a power-ON host apparatus; a required-printing-capacity computing unit to compute required network printing capacity based on the host information; and a power save control unit to control the power save mode of each image forming apparatus. The power save control unit of the master image forming apparatus controls the power save mode of each image forming apparatus.

9 Claims, 19 Drawing Sheets

PROCESS OF TIME UPDATING ROUTINE

SHEETS PRINTED BY PRINTERS AND
CLIENT APPARATUSES FOR PAST ONE WEEK

|   | Pr1 | Pr2 | Pr3 | Pr4 | TOTAL |
|---|---|---|---|---|---|
| C1 | 20000 | 1000 | 4000 | 1000 | 26000 |
| C2 | 0 | 1000 | 8000 | 6000 | 15000 |
| C3 | 15000 | 12000 | 1000 | 20000 | 48000 |
| C4 | 18000 | 4000 | 3000 | 1000 | 26000 |
| C5 | 1000 | 20000 | 2000 | 1000 | 24000 |
| TOTAL | 54000 | 38000 | 18000 | 29000 |  |

NOTE (TOTAL IS CONVERTED TO A4 SIZE)

SHEETS PRINTED BY NETWORK PRINT SYSTEM
FOR EACH TIME ZONE

FIG. 18

POWER MODE OF PRINTER

| POWER MODE | | |
|---|---|---|
| NORMAL MODE | NORMAL ON-LINED STATUS OF PRINTER (NOT POWER-SAVE MODE) | POWER CONSUMPTION IS NORMAL LEVEL (POWER CONSUMPTION INCREASES WHEN PRINTING) |
| POWER-SAVE MODE (LEVEL 1) | 50% OF FUSING TEMPERATURE | POWER IS CONSUMED GREATLY TO MAINTAIN HIGH TEMPERATURE CONDITION FOR A FUSING UNIT. THE TEMPERATURE IS MAINTAINED AT A LOWER LEVEL COMPARED TO FUSING TEMPERATURE USED FOR PRINTING SUCH AS 50% OF FUSING TEMPERATURE TO REDUCE POWER CONSUMPTION COMPARED TO NORMAL MODE |
| POWER-SAVE MODE (LEVEL 2) | SHUTOFF POWER SUPPLY TO ENGINE UNIT | SHUTOFF POWER SUPPLY TO ENGINE UNIT OF PRINTER ENTIRELY TO REDUCE POWER CONSUMPTION OF ENGINE UNIT |

FIG. 19

PRINTER INFORMATION STORED IN PRINTER
STATUS MANAGEMENT TABLE

| NO | | |
|---|---|---|
| 1 | COLOR/ MONOCHROME | IF COLOR PRINTER AND MONOCHROME PRINTER ARE BOTH PRESENT, COLOR PRINTER THAT CAN PRINT COLOR AND MONOCHROME IMAGES MAY BE SELECTED. IF PRINT JOB INCLUDES COLOR DATA AND IT IS DETERMINED THAT CLIENT USES MONOCHROME PRINTER BASED ON CLIENT HISTORY INFORMATION, MONOCHROME PRINTER CAN BE SELECTED. |
| 2 | PRINT SPEED | HIGH SPEED PRINTER MAY BE SELECTED. IF USER IS NOT SO RUSH FOR PRINTING, MIDDLE SPEED PRINTER MAY BE SELECTED IN VIEW OF LOWER POWER CONSUMPTION PER UNIT TIME. SPEED IS SET BASED ON PRIORITY REQUEST OF USER OR CLIENT SUCH AS TIME-SAVING PRINTING OR POWER-SAVE PRINTING. |
| 3 | APPLICABLE SHEET SIZE | VARIOUS SHEETS SUCH AS A4, A3, B5, B4, LETTER, LEGAL CAN BE USED. IN JAPAN AND EUROPE, A4 AND A3 SHEETS ARE TYPICALLY USED. A4 AND A3 SHEETS MAY BE REFERRED TO PLAIN PAPER, AND OTHER SIZES MAY BE REFERRED TO SUBSTANTIALLY PLAIN PAPER. PRINTER HAVING SHEET TRAY STACKED WITH A4 OR A3 SHEETS ARE USED AT FIRST (SHEET SIZE IS DETERMINED BASED ON USER NEEDS). |
| 4 | REMAINING AMOUNT OF CONSUMABLES | REMAINING AMOUNT OF CONSUMABLES INCLUDES REMAINING SHEET NUMBERS AND REMAINING TONER AMOUNT. SHEET CAN BE REFILLED QUICKLY. BECAUSE TONER REFILLING IN TONER CONTAINER MAY NEED SOME TIME TO OBTAIN NEW TONER, PRINTER HAVING GREATER REMAINING TONER AMOUNT MAY BE SELECTED. |

FIG. 20

PRINTER INFORMATION (CLIENT INFORMATION)
STORED IN CLIENT MANAGEMENT TABLE

| NO | | |
|---|---|---|
| 1 | TOTAL NUMBER OF ON-LINED CLIENT APPARATUSES | THIS INFORMATION IS USED TO DETERMINE THE NUMBER OF PRINTERS THAT ARE TO BE ON-LINED TO CORRESPOND TO TOTAL NUMBER OF ON-LINED CLIENT APPARATUSES |
| 2 | PRINT-HISTORY INFORMATION OF CLIENT APPARATUS | THIS INFORMATION MAY BE<br>1) PRINTER(S) USED FOR PAST PRINTING<br>2) APPLICATIONS AND SHEET USED FOR PAST PRINTING<br>3) TOTAL NUMBER OF PRINTED PAGES |
| 3 | CURRENTLY USED APPLICATION(S) | |

IMAGE FORMING APPARATUS, NETWORK PRINTING SYSTEM, POWER SAVE CONTROL METHOD, AND POWER SAVE CONTROL PROGRAM, AND STORAGE MEDIUM

CROSS-REFERENCE TO RELATED APPLICATION

This application claims priority pursuant to 35 U.S.C. §119 to Japanese Patent Application No. 2012-064746, filed on Mar. 22, 2012 in the Japan Patent Office, which is incorporated by reference herein in its entirety.

BACKGROUND

1. Technical Field

The present invention relates to an image forming apparatus, a network printing system, a power save control method, and a power save control program, and more particularly to an image forming apparatus, a network printing system, a power save control method, and a power save control program to conduct a power-saving operation efficiently while enhancing a power-saving effect.

2. Background Art

With the advent of office automation (OA), network printing systems can now be configured with one or more host apparatuses or terminal apparatuses such as personal computers and word processors, in which the one or more host apparatuses share a plurality of printers connected via the network.

In such a network printing system, when a plurality of host apparatuses use the connected printers, many print jobs are issued to the printers, and the printers process the issued print jobs sequentially.

With rising demand for reduced resource use, resource use reduction is also expected of image forming apparatuses. Accordingly, such image forming apparatuses are now equipped with a power-saving function, such that, if no operation request is issued in a stand-by mode for a given time period, the image forming apparatus is shifted to a power save mode in which power supply to major components is stopped, or the power supply is reduced for lower energy consumption.

However, in such a network printing system, the power-saving function is activated for each image forming apparatus independently, which means each image forming apparatus reduces power consumption independently. Therefore, the power consumption for the entire network printing system may not be reduced effectively.

Conventionally, an image forming apparatus connected to a plurality of client terminals via a network includes a setting unit to set the power save mode, and a storage unit to store print history of each one of the client terminals. The setting unit refers to the print history stored in the storage unit, and based on attributes of each of the client terminals, the setting unit determines whether or not to shift the image forming apparatus to the power save mode.

For example, JP-2010-003083-A discloses a technique in which shifting to the power save mode is conducted by referring to the print history of the client terminals and attributes of the client terminals. However, if a plurality of image forming apparatuses and a plurality of client apparatuses are connected on a network, such technology may not be effective for the entire network system.

In a network printing system configured with a plurality of image forming apparatuses and a plurality of host apparatuses connected one to another via a network, the plurality of image forming apparatuses can conduct the power save control using the above mentioned conventional method, which uses stored print histories of client apparatuses and attributes of each of client apparatuses to shift to the power save mode. Such power save control is conducted for each one of the image forming apparatuses independently without considering the entire network printing system. Therefore, a resource imbalance may occur between active image forming apparatuses and active client apparatuses in which the number of active image forming apparatuses may become excessive compared to the number of active client apparatuses, by which the power consumption for the entire network printing system cannot be reduced effectively.

SUMMARY

In one aspect of the present invention, an image forming apparatus is devised, which is one of a plurality of image forming apparatuses connectable to a plurality of host apparatuses capable of generating print data and requesting a print request of the print data to at least one of the plurality of image forming apparatuses via a network. The plurality of image forming apparatuses is capable of printing an image based on the print data and the print request received from at least one of the host apparatuses on a recording medium, and the plurality of image forming apparatuses has a power save mode to reduce power consumption.

The image forming apparatus includes an apparatus information collection unit to obtain print history and function information as apparatus information of each of the image forming apparatuses disposed on the network and stores the apparatus information in an apparatus information storing unit; a priority order determination unit to determine a priority order for setting a master image forming apparatus that controls the power save mode of each of the image forming apparatuses currently in operation based on the apparatus information stored in the apparatus information storing unit; a master determination unit to identify an image forming apparatus having the highest priority order among the currently operating image forming apparatuses disposed on the network as the master image forming apparatus; a host information collection unit to collect print history and current print settings as host information of at least one power-ON host apparatus disposed on the network and to store the host information to a host information storage unit; a required-printing-capacity computing unit to compute required network printing capacity based on the host information stored in the host information storage unit; and a power save control unit to control the power save mode of each of the image forming apparatuses disposed on the network based on the priority order, the apparatus information of the image forming apparatus corresponding to the priority order, and the required printing capacity, wherein the power save control unit of the master image forming apparatus, identified by the master determination unit, controls the power save mode of each of the image forming apparatuses disposed on the network.

In another aspect of the present invention, a method of power save control for a network printing system configured with a plurality of image forming apparatuses and a plurality of host apparatuses connectable with each other via a network is devised. The plurality of host apparatuses is capable of generating print data and requesting a print request of the print data to at least one of the plurality of image forming apparatuses. The plurality of image forming apparatus is capable of printing an image based on the print data and the print request received from at least one of the host apparatuses on a recording medium. The plurality of image forming apparatus has a power save mode to reduce power consumption. The method includes the steps of 1) obtaining print history and function information as apparatus information of each of the image forming apparatuses disposed on the network and storing the apparatus information in an apparatus information storing unit; 2) determining a priority order for setting a master image forming apparatus that controls the power save mode of each of the image forming apparatuses currently in operation based on the apparatus information stored in the apparatus information storing unit; 3) identifying an image forming apparatus having the highest priority order among the currently operating image forming apparatuses disposed on the network as the master image forming apparatus; 4) collecting print history and current print settings as host information of at least one power-ON host apparatus disposed on the network and storing the host information to a host information storage unit; 5) computing required network printing capacity based on the host information stored in the host information storage unit; 6) controlling the power save mode of each of the image forming apparatuses disposed on the network based on the priority order, the apparatus information of the image forming apparatus corresponding to the priority order, and the required printing capacity; and 7) controlling the power save mode of each of the image forming apparatuses disposed on the network using the power save controlling by the identified master image forming apparatus.

In another aspect of the present invention, a non-transitory computer-readable storage medium storing a program that, when executed by a computer, causes the computer to execute a method of power save control for a network printing system configured with a plurality of image forming apparatuses and a plurality of host apparatuses connectable with each other via a network is devised. The plurality of host apparatuses is capable of generating print data and requesting a print request of the print data to at least one of the plurality of image forming apparatuses. The plurality of image forming apparatus is capable of printing an image based on the print data and the print request received from at least one of the host apparatuses on a recording medium. The plurality of image forming apparatus has a power save mode to reduce power consumption. The method includes the steps of 1) obtaining print history and function information as apparatus information of each of the image forming apparatuses disposed on the network and storing the apparatus information in an apparatus information storing unit; 2) determining a priority order for setting a master image forming apparatus that controls the power save mode of each of the image forming apparatuses currently in operation based on the apparatus information stored in the apparatus information storing unit; 3) identifying an image forming apparatus having the highest priority order among the currently operating image forming apparatuses disposed on the network as the master image forming apparatus; 4) collecting print history and current print settings as host information of at least one power-ON host apparatus disposed on the network and storing the host information to a host information storage unit; 5) computing required network printing capacity based on the host information stored in the host information storage unit; 6) controlling the power save mode of each of the image forming apparatuses disposed on the network based on the priority order, the apparatus information of the image forming apparatus corresponding to the priority order, and the required printing capacity; and 7) controlling the power save mode of each of the image forming apparatuses disposed on the network using the power save controlling by the identified master image forming apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 14 shows a flowchart of power save control process of a client apparatus when power supply is turned ON;

FIG. 18 shows examples of power modes of a printer;

FIG. 19 shows an example of printer information stored in a printer status information management table; and FIG. 20 shows an example of printer information stored in a client management table.

Figure 1:
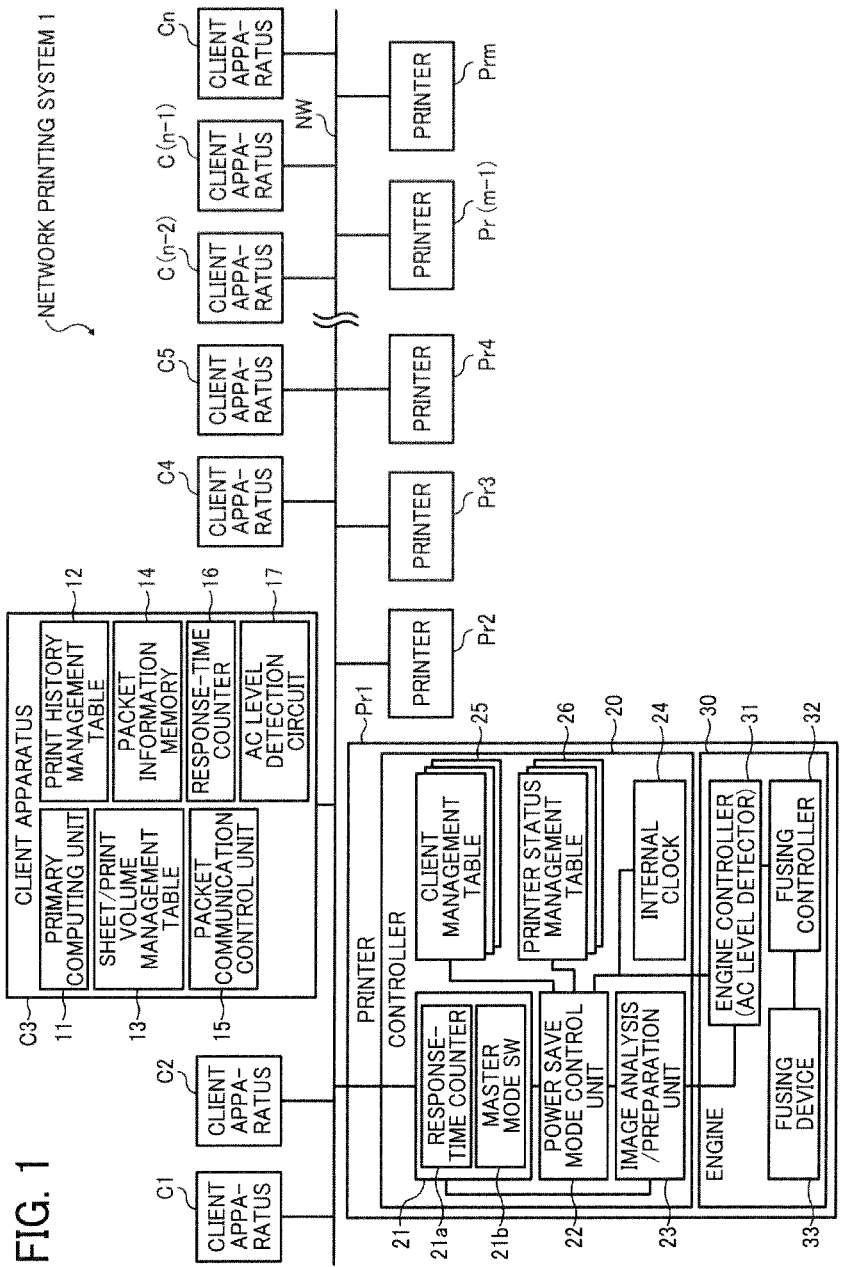
FIG. 1 shows an example system configuration of a network printing system according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

FIGS. 1 to 20 show an image forming apparatus, a network printing system, a power save control method, and a power save control program according to an example embodiment. FIG. 1 shows an example of a configuration of a network printing system 1, which applies an image forming apparatus, a network printing system, a power save control method, and a power save control program according to an example embodiment.

As shown in FIG. 1, the network printing system 1 includes, for example, a plurality of printers Pr1 to Prm, a plurality of client apparatuses C1 to Cn, and other apparatuses such as a server connectable with each other using a network NW such as local area network (LAN).

Each of the client apparatuses C1 to Cn may be used as a host apparatus including a computer having typical hardware configuration and software configuration. For example, by installing a power save control program to the host apparatus according to an example embodiment, as shown in FIG. 1, the client apparatus C3 can be configured with a primary computing unit 11, which is a main computer, a print history management table 12, a sheet/print volume management table 13, a packet information memory 14, a packet communication control unit 15, a response-time counter 16, and an AC level detection circuit 17 which detects alternating current.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium or carrier medium for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software combination. In example embodiment, processing units, computing units, or controllers can be configured with using various types of processors, circuits, or the like such as a programmed processor, a circuit, an application specific integrated circuit (ASIC), used singly or in combination.

The client-apparatus-use power save control program for implementing power save control method according to an example embodiment can be stored in the above described storage medium or carrier medium. The client apparatuses C1 to Cn can read such program from such storage medium or carrier medium, and can be configured as host apparatuses to conduct the power save control with other client apparatuses C1 to Cn and the printers Pr1 to Prm on the network NW.

Each of the client apparatuses C1 to Cn employs following units. The primary computing unit 11 is used as a main computer having a typical hardware configuration and software configuration. The print history management table 12 stores print history, which includes history information such as printing information conducted in the past. The sheet/print volume management table 13 stores sheet settings and page numbers of each file for a currently used application, wherein page numbers information is used as basic information for estimating print volume. The packet information memory 14 stores status information of each of the printers Pr1 to Prm on the network NW such as whether a printer is on-line, or power save mode, or the like. The packet communication control unit 15 controls transmission/reception of packets on the network NW. The response-time counter 16 counts up a time used for detennining whether to proceed to a next process after transmitting packet data. Specifically, when a packet data is transmitted, and then no responses is received for a given time period, the response-time counter 16 counts up such no response time, wherein such situation may be referred to as the response-time counter 16 counts up up a time in this specification. The AC level detection circuit 17 detects AC level of the client apparatuses C1 to Cn to determine whether alternating current (AC) power supply to the client apparatuses C11 to Cn is turned OFF. The print history management table 12, the sheet/print volume management table 13, the packet information memory 14, and the packet communication control unit 15 can be collectively functioned as a host information management unit.

In this disclosure, the printers Pr1 to Prm are used as an example of image forming apparatuses using electrophotography and inkjet system. However, it should be noted that the image forming apparatuses are not limited to printers, but other image forming apparatuses having image forming engines such as copiers, facsimile machines, and multi-functional apparatuses can be used as the image forming apparatuses.

As shown in FIG. 1, the printer Pr1 includes, for example, a controller 20, an engine 30, and an operation/display unit. By installing a power save control program for the image forming apparatus according to an example embodiment, the controller 20 can be configured with a packet communication control unit 21, a power save mode control unit 22, an image analysis/preparation unit 23, an internal clock circuit 24, a client management table 25, and a printer status management table 26. Further, the engine 30 includes, for example, an engine controller 31, a fusing controller 32, and a fusing device 33.

The printer-use power save control program for implementing power save control method according to an example embodiment can be stored in the above described storage medium or carrier medium. The printers Pr1 to Prm can read such program from such storage medium or carrier medium, and can be configured as image forming apparatuses to conduct the power save control with other printers Pr1 to Prm and the client apparatuses C1 to Cn on the network NW.

In each of the printers Pr1 to Prm, the packet communication control unit 21 of the controller 20 can be used as a function information collection unit, and a host information collection unit. Specifically, the packet communication control unit 21 controls transmission/reception of packet information with the network NW; receives a print job from the client apparatuses C1 to Cn; receives client information or host information from each of the client apparatuses C1 to Cn, wherein the client information includes, for example, print history, sheet settings for currently used application; and controls transmission/reception of control signal and data from other printers connected with each other on the network NW, wherein such signal and data include function information of other printers required for the power save control process such as information of color/monochrome, applicable sheet size, print speed, remaining amount of consumables (e.g., toner, sheet).

The packet communication control unit 21 includes, for example, a response-time counter 21a, and a master mode switch (SW) 21b. The response-time counter 21a counts up a time used for determining whether to proceed to a next process after transmitting packet data. Specifically, when a packet data is transmitted, and then no responses is received for a given time period, the response-time counter 21a counts up such no response time, wherein such situation may be referred to as the response-time counter 16 counts up a time in this specification. The master mode switch (SW) 21b is used to identify which printer is a master printer among the printers Pr1 to Prm, which are on-line on the network NW.

The power save mode control unit 22 can be used as a priority order determination unit, a master determination unit, a required-printing-capacity computing unit, and a power save control unit. The power save mode control unit 22 conducts a priority order determination process to determine priority order among the printers Pr1 to Prm based on apparatus information stored in the printer status management table 26 (to be described later). The priority order determination process is conducted to determine priority order among the currently operating or active printers to select a master printer or master image forming apparatus based on the priority order, wherein the master printer can be used to control the power save mode of the currently operating printers.

Further, the power save mode control unit 22 conducts a master determination process to identify a printer having the highest priority order among the currently operating printers on the network NW as a master printer.

Further, the power save mode control unit 22 conducts a required-printing-capacity computing process based on the host information stored in the client management table 25, in which the power save mode control unit 22 computes averaged printing performance M or required printing capacity M, which is required on the network NW, which will be described later.

Further, the power save mode control unit 22 conducts a power save control process based on the above-mentioned priority order, apparatus information and the averaged printing performance M of the printers set with a given priority order, in which the power save mode control unit 22 controls the power save mode for each of the printers on the network NW. Specifically, the power save mode control unit 22 controls a shift to the power save mode for reducing power consumption of the printers, and a return from the power save mode.

The image analysis/preparation unit 23, connected to the power save mode control unit 22, analyzes a received print job and converts the received data to bitmap data. The internal clock circuit 24, connected to the power save mode control unit 22, counts up time such as current time, and other setting times (e.g., waiting time to activate shifting from stand-by mode to power save mode).

The client management table 25, used as a host information storage unit, is connected to the power save mode control unit 22. The client management table 25 stores client information or host information of each of the client apparatuses C1 to Cn on the network NW obtained by using the packet communication control unit 21 such as information of print history, sheet settings of currently used application.

The printer status management table 26, used as an apparatus information storing unit and connected to the power save mode control unit 22, stores function information of a printer that the printer status management table 26 belongs to. Such function information includes, for example, printer property information such as internet protocol (IP) address, master/slave information of an printer that the printer status management table 26 belongs to; printer information of other printers connectable via the network NW (e.g., priority order for master printer, color/monochrome type, print speed, applicable sheet size, remaining amount of consumables), and print history of the printer that the printer status management table 26 belongs to, and print history of the other printers in a given past period.

The engine 30 may employ image forming methods such as electrophotography, inkjet system, or the like. In an example embodiment, at least the printer Pr1 uses an engine of electrophotography.

As for the engine 30 of the printer Pr1, the engine controller 31 receives image drawing data and control signal from the image analysis/preparation unit 23 of the controller 20, wherein the image drawing data is, for example, bitmap data. Based on the image drawing data and control signal, the engine controller 31 controls the engine 30 to conduct an image forming operation. Further, when a control signal is input to the engine controller 31 from the power save mode control unit 22, the engine controller 31 controls a fusing temperature of the fusing device 33 via the fusing controller 32, in particular, conducts the power save control process (to be described later). Further, the engine controller 31 includes an AC detector to detect an input level of an AC power source, and outputs a detection result to the controller 20.

Under the control of the engine controller 31, the fusing controller 32 conducts temperature control and the ON/OFF control of power supply for the fusing device 33.

The fusing device 33 includes, for example, a fusing roller, a pressure roller rotatable with the fusing roller, and a fusing heater. The fusing roller is pressed with the pressure roller with a given pressure. The fusing heater, heated by supplying electricity, heats the fusing roller. A sheet transferred with a toner image is transported between the fusing roller and the pressure roller.

In the fusing device 33, the fusing heater is heated by controlling current supply using the fusing controller 32 so that the fusing roller is heated at a given fusing temperature. A sheet transferred with a toner image is transported between the fusing roller and the pressure roller to apply heat and pressure to the sheet to fuse the toner image. The temperature of the fusing roller can be detected by a fusing thermistor, and a detected temperature signal is output to the fusing controller 32. Based on the signal of temperature detected by the fusing thermistor, the fusing controller 32 controls the current supply to the fusing heater to control the temperature of the fusing roller at a given temperature.

A description is given of operation of the network printing system 1 according to an example embodiment. As for the network printing system 1 configured with a plurality of printers Pr1 to Prm and a plurality of client apparatuses C1 to Cn connectable via the network NW, the power-saving can be enhanced as described as follows.

Figure 2:
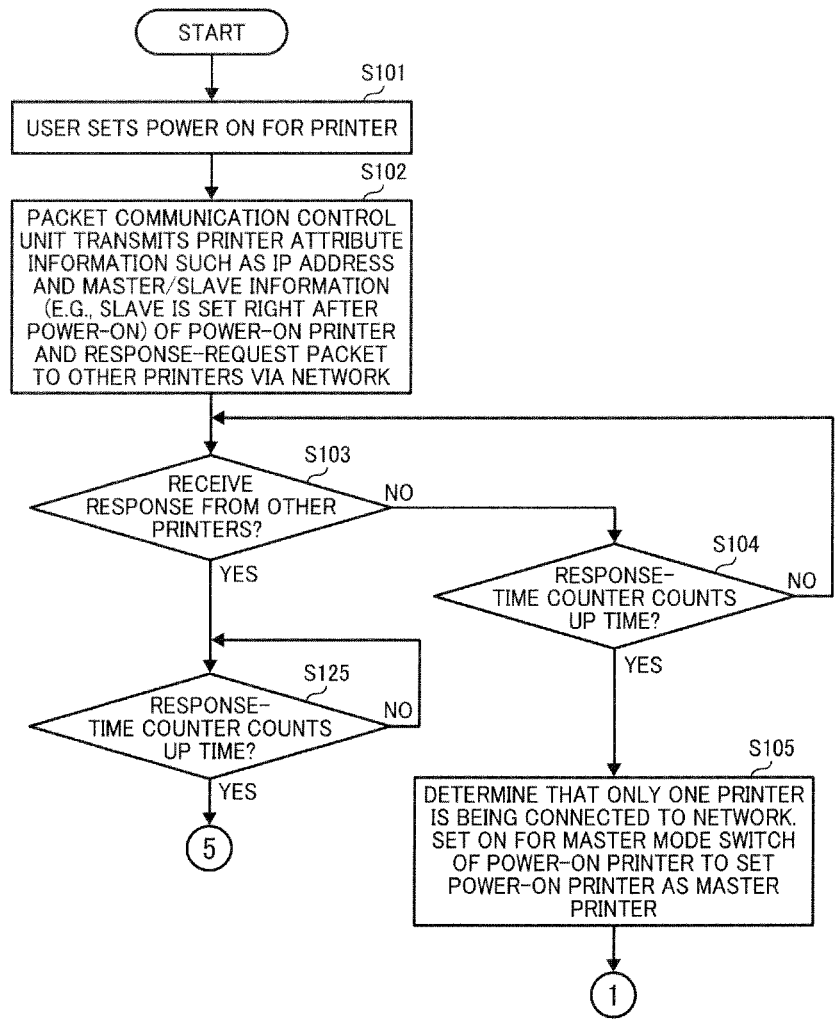
FIG. 2 shows a flowchart of power save control process for printers.

As shown in FIG. 2, a user sets power-supply ON for any one of the printers Pr1 to Prm disposed on the network NW (step S101). Hereinafter, the printer that is turned power-supply ON may be referred to as the power-ON printer. The packet transmission/reception unit 21 of the power-ON printer transmits printer property information of the power-ON printer (e.g., IP address, master/slave information) stored in the printer status management table 26, and a response-request packet to other printers via the network NW (step S102). At this stage, the power-ON printer among the printers is set as a slave printer.

Figure 3:
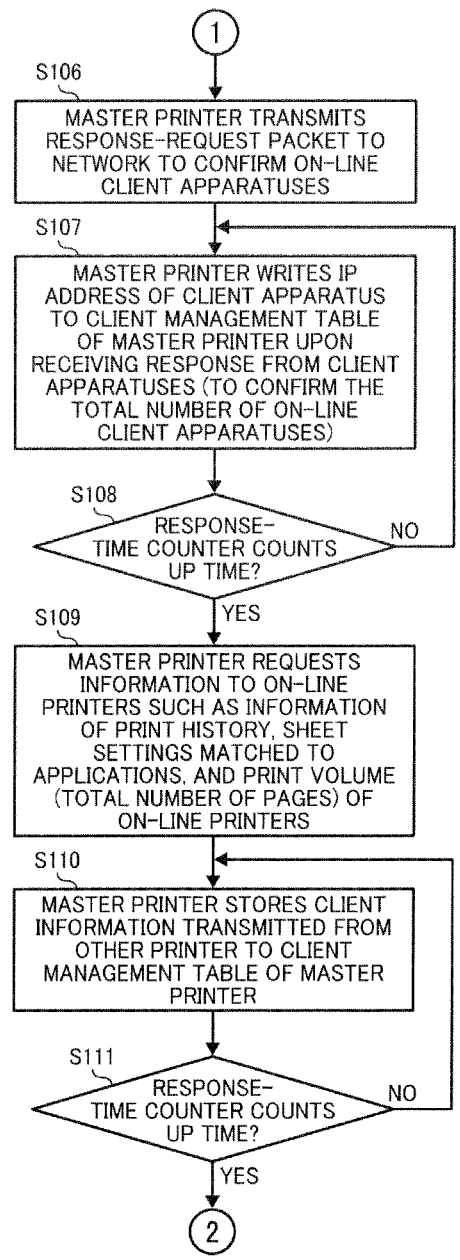
FIG. 3 shows a flowchart of power save control process for printers continued from FIG. 2.

The power-ON printer checks whether the power-ON printer has received a response from other printers connected on the network NW, and checks whether the response-time counter 21a counts up a given time (steps S103 and S104). If a given time (e.g., 3000 ms) elapses without receiving responses from other printers, it is determined that the power-ON printer does not receive responses from other printers. The response-time counter 21a counts up such given time. If no responses is received from other printers and the response-time counter 21a counts up the given time, the power-ON printer determines that only the power-ON printer is the active or in-operation printer among the printers connected on the network NW, and then set the master mode SW 21b of the power-ON printer to ON to set the power-ON printer itself as a master printer (step S105). Then, as shown in FIG. 3, the power-ON printer, which is the master printer, transmits a response-request packet to the network NW to confirm which client apparatuses C1 to Cn are on-line on the network NW (step S106).

The master printer writes host information such as IP addresses of the client apparatuses C1 to Cn that issue responses to the client management table 25 of the master printer, and confirms the total number of the client apparatuses C1 to Cn that are on-line status (step S107). Then, the master printer checks whether the response-time counter 21a counts up a given time (step S108).

If the response-time counter 21a does not count up the given time (step S108: NO), the process returns to step S107, and the master printer repeatedly conducts the writing process of IP addresses of the client apparatuses C1 to Cn, which have issued responses, to the client management table 25 of the master printer (steps S107 and S108).

If the response-time counter 21a counts up up the given time (step S108: YES), the master printer requests one or more on-line printers to transmit client or host information such as print history, sheet settings of currently used application, and information of print volume such as total number of pages (step S109). The master printer stores the client information transmitted from the on-line printers in the client management table 25 of the master printer (step S110). Then, the master printer checks whether the response-time counter 21a counts up the given time (step S111).

If the response-time counter 21a does not count up the given time (step S111: NO), the master printer returns to step S110, and repeatedly conducts storing of the client information transmitted from each of the on-line printers to the client management table 25 of the master printer (steps S110 and S11).

Figure 4:
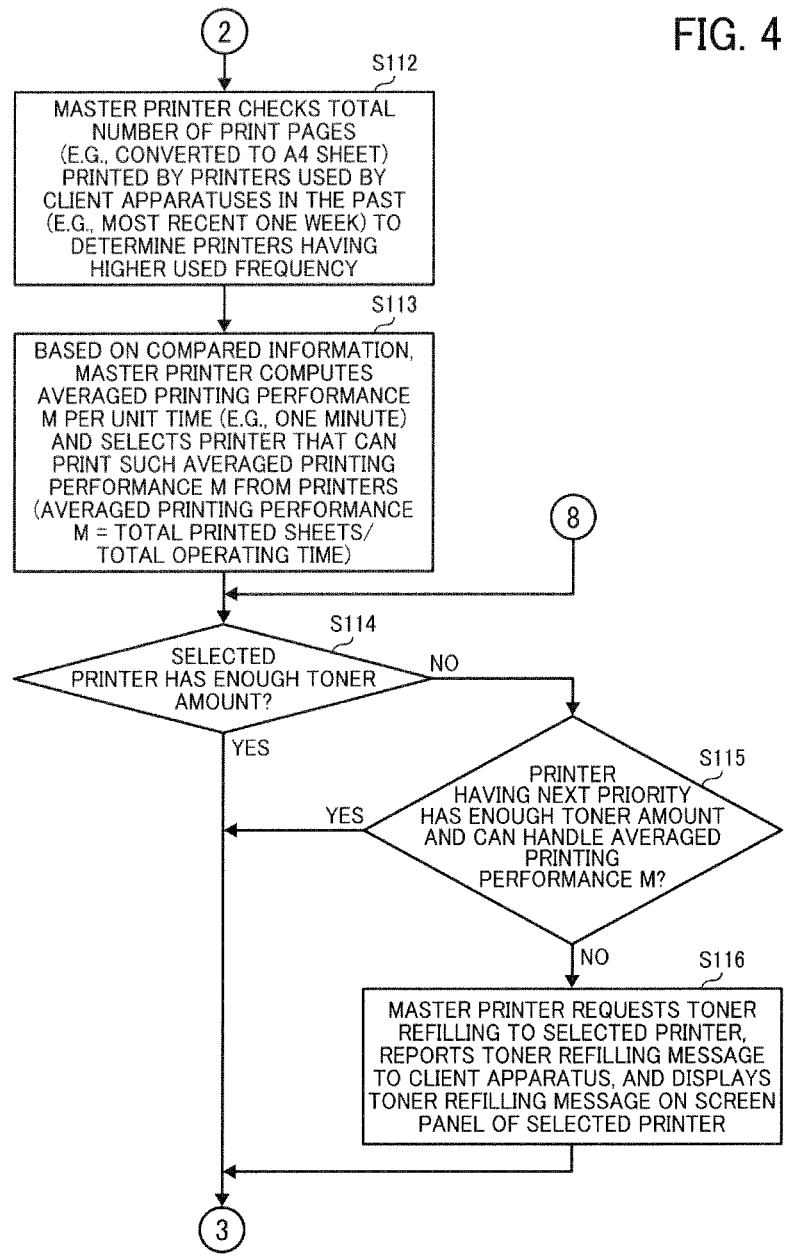
FIG. 4 shows a flowchart of power save control process for printers continued from FIG. 3.

If the response-time counter 21a counts up the given time (step S111: YES), as shown in FIG. 4, the master printer checks which client apparatuses C1 to Cn used which printers Pr1 to Prm in a given past time period to determine the printer-used frequency order among the printers Pr1 to Prm that can be used by each of the client apparatuses C1 to Cn (step S112). Specifically, the master printer checks the used frequency order among the printers Pr1 to Prm based on the total number of printed pages (e.g., total number of printed pages is converted to total number of sheets of A4 size) printed by instructions of the client apparatuses C1 to Cn in a given past time period (e.g., most recent one week). With such processing, it can determine the used frequency among the printers Pr1 to Prm such as which printer was used with the highest used frequency and which printer was used with the lowest used frequency. As such, the priority order of the printers Pr1 to Prm can be determined.

In the network system 1, a printer not selected as the master printer may have a higher used frequency compared to the selected master printer in a certain situation. When the master printer is selected based on the order of actually printed sheets record of the printers Pr1 to Prm, the above-mentioned power-ON printer may or may not be selected as the master printer. If the above mentioned power-ON printer is selected as the master printer and the power-ON printer (master printer) is not the printer having the highest used frequency, the power save mode is set for such master printer. However, even if the master printer is set with the power save mode, the controller 20 of the master printer can be excluded from the power save mode, by which the controller 20 of the master printer can conduct the power save control for the entire printers.

Then, the master printer computes an averaged printing performance M per unit time (e.g., one minute). The averaged printing performance M can be computed by dividing actually printed sheets with the total operating time of printers used for the printing, wherein such information can be obtained, for example, from the printers. Based on the averaged printing performance M, one or more printers that can handle the averaged printing performance M can be selected from the printers having greater printing capacities (step S113), wherein the averaged printing performance M indicates the required printing capacity which may be required for the network printing system.

Figure 15:
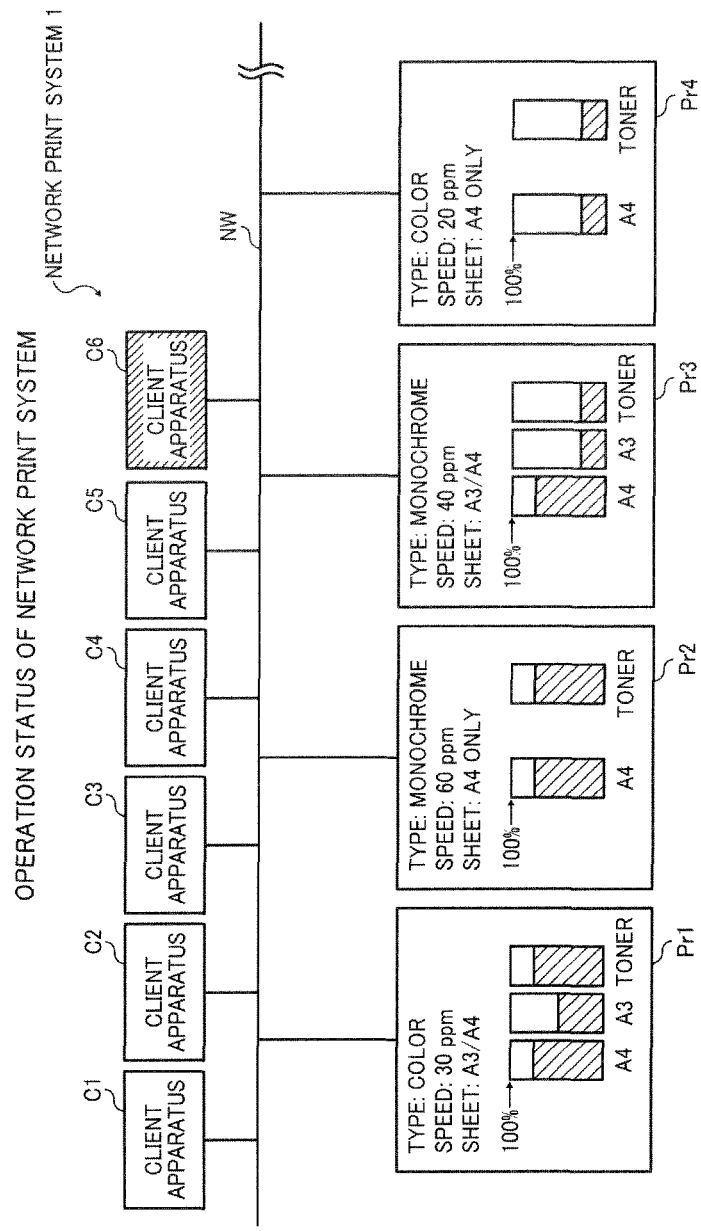
FIG. 15 shows an example of operation status of the network printing system.

As one example case, as shown in FIG. 15, four printers Pr1 to Pr4 and six client apparatuses C1 to C6 are connected to the network NW while the client apparatus C6 is turned power-OFF. Each of the printers Pr1 to Pr4 has following information. The printer Pr1 has information such as print type of color, speed of 30 ppm (page per minute), sheet type of A3/A4, and remaining sheet numbers/remaining toner amount. The printer Pr2 has information such as print type of monochrome, speed of 60 ppm, sheet type of A4, and remaining sheet numbers/remaining toner amount. The printer Pr3 has information such as print type of monochrome, speed of 40 ppm, sheet type of A3/A4, and remaining sheet numbers/remaining toner amount. The printer Pr4 has information such as print type of color, speed of 20 ppm, sheet type of A4, and the remaining sheet numbers/remaining toner amount.

In such configuration, each of the client apparatuses C to C5 can use each of the printers Pr1 to Pr4 to print images. For example, 図 16 shows one case that the client apparatuses C1 to C5 used the printer Pr1 for a given past time (e.g., past one week) to print images on sheets, in which the total number of printed pages (converted to A4 size sheet) are shown. As shown in 図 16, the client apparatus C used the printer Pr1 for printing 20,000 sheets, the client apparatus C2 used the printer Pr1 for printing no sheets, the client apparatus C3 used the printer Pr1 for printing 15000 sheets, the client apparatus C4 used the printer Pr1 for printing 18000 sheets, and the client apparatus C5 used the printer Pr1 for printing 1000 sheets. Therefore, the printer Pr1 was used for printing a total of 54,000 sheets. Similarly, the printer Pr2 was used for printing a total of 38,000 sheets, the printer Pr3 was used for printing a total of 18,000 sheets, and the printer Pr4 was used for printing a total of 29,000 sheets. Therefore, the order of used frequency of printers is from the printers Pr1, Pr2, Pr4, and Pr3 (Pr1>Pr2>Pr4>Pr3), which means the printer Pr1 has the highest used frequency.

Then, the master printer computes the total number of printed pages for the past one week by adding pages printed by the printers Pr1 to Pr4 (i.e., 54000+38000+18000+29000=139000). If it is assumed that each of the printers Pr1 to Pr4 is operated for eight hours per day and five days per week, the averaged printing performance M per minute becomes "M=139000÷5÷8÷60=57.9 pages/min." In this case, the averaged printing performance of 57.9 pages/min means the required printing capacity for the network printing system.

At first, the master printer selects the printer Pr1, having the highest actually printed sheets record among the printers Pr1 to Pr4 on the network NW in a case of 図 16. Because the print speed of the printer Pr1 is 30 ppm, which is lower than the required printing capacity of 57.9 ppm (30 ppm<57.9 ppm), the printer Pr2 having the second highest actually printed sheets record is also selected by the master printer. By combining the print speed of 60 ppm of the printer Pr2 to the print speed of 30 ppm of the printer Pr1 (i.e., 30+60), the required printing capacity or speed of 57.9 ppm can be secured (30+60=90>57.9).

Therefore, in a case of 図 16, the printers Pr1 and Pr2 are selected as active or in-operation printers among the printers Pr1 to Pr4.

Figures 16, 17:
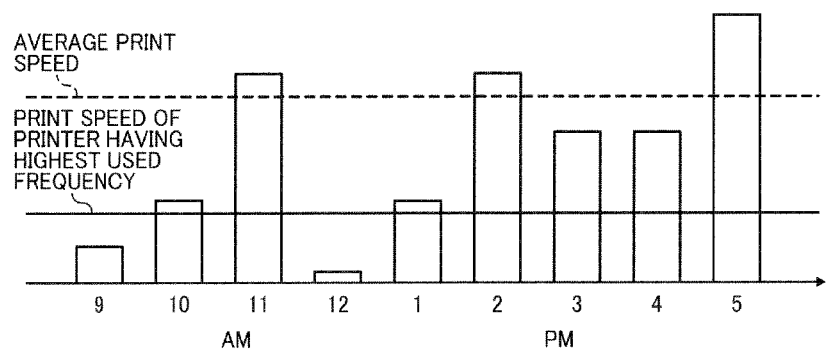
FIG. 16 shows an example of actually printed sheets record by each printer and each client apparatus for past one week.
FIG. 17 shows an example of actually printed sheets record by printers of the network printing system for each time zone.

It should be noted that the above-described averaged printing performance M (e.g., 57.9 ppm) is just the averaged printed sheets. Typically, the printing operation condition on the network printing system 1 changes in line with a time schedule. For example, when the working hours is from 9:00 AM to 6:00 PM, 12:00 AM to 1:00 PM may be set as a lunch break. In such a case, the actually printed sheets record may change along the time line as shown in FIG. 17. The actually printed sheets record for each time zone can be recorded as log information for each time zone, which may be stored in the printers or in the client apparatuses with print history. As such, the actually printed sheets record for each time zone for a given period (e.g., past one week) can be computed, and then active printers can be selected from the printers Pr1 to Prm in view of the time zone.

As above described, the master printer selects one or more printers that can handle the averaged printing performance M from the printers Pr1 to Prm having higher actually printed sheets record. Then, the master printer checks whether the toner amount remaining in the selected printer is at an enough level such as 80% of the full storage capacity of toner amount (step S114).

If the remaining toner amount is not enough (step S114: NO), the master printer checks whether a printer having the second or next highest priority order and an enough level of toner amount is present among the printers on the network NW, and checks whether such printer can handle the averaged printing performance M (step S115).

If the master printer determines that no printer has the enough level of toner amount and no printer can handle the averaged printing performance M (step S115: NO), the master printer reports a toner refilling message to the client apparatuses C1 to Cn to request the toner refilling to the printer selected at step S113, and instructs the printer selected at step S113 to display the toner refilling message on a display panel such as a screen panel of an operation/display unit of the printer selected at step S113 (step S116).

Figure 5:
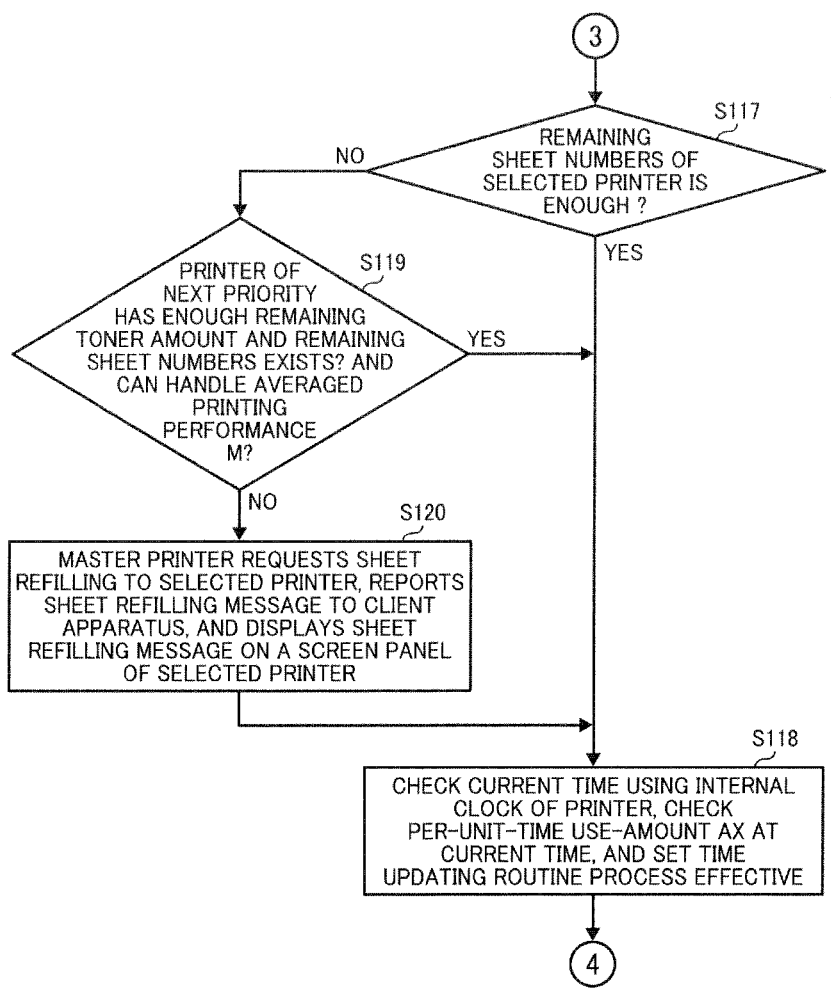
FIG. 5 shows a flowchart of power save control process for printers continued from FIG. 4.

Then, as shown in FIG. 5, the master printer checks whether the remaining sheet numbers of the selected printer is at an enough level such as 80% of full capacity of sheets store-able in printer (step S117).

Further, if the master printer determines that one printer has an enough level of toner amount and can handle the averaged printing performance M (step S115: YES) or if the printer selected at step S113 has an enough level of toner amount (step S114: YES), the master printer checks whether the remaining sheet numbers of the selected printer is at an enough level such as 80% of full capacity of sheets store-able in printer (step S117) as shown in FIG. 5.

If the master printer determines that the selected printer has the enough level of remaining sheet numbers (step S117: YES), the master printer checks current time using the internal clock circuit 24, and computes a per-unit-time use-amount ax for the current time zone, and sets the time updating routine process shown in FIG. 10 as active or effective (step S118), and compares the per-unit-time use-amount ax with the averaged printing performance M, and print speed A of the printer having the highest used frequency (step S121) as shown in 図 6.

Further, if the remaining sheet numbers is not at the enough level (step S117: NO), the master printer checks whether another printer having the second highest priority order has an enough level of remaining toner amount and remaining sheet numbers is present on the network NW, and whether such another printer can handle the averaged printing performance M (step S119).

If such another printer does not have an enough level of remaining toner amount and remaining sheet numbers, and cannot handle the averaged printing performance M (step S119: NO), the master printer reports a sheet refilling message to the client apparatuses C1 to Cn to request a sheet refilling for the printer selected at step S113, and instructs the printer selected at step S113 to display the sheet refilling message on a display panel such as a screen panel of an operation/display unit of the selected printer (step S120). Further, the master printer reports a toner refilling message to the client apparatuses C1 to Cn to request the toner refilling to the printer selected at step S113, and instructs the printer selected at step S113 to display the toner refilling message on a display panel such as a screen panel of an operation/display unit of the printer selected at step S113.

The master printer checks current time using the internal clock circuit 24, and computes the per-unit-time use-amount ax of the current time zone, and sets the time updating routine process (FIG. 10) as effective (step S118).

Figure 6:
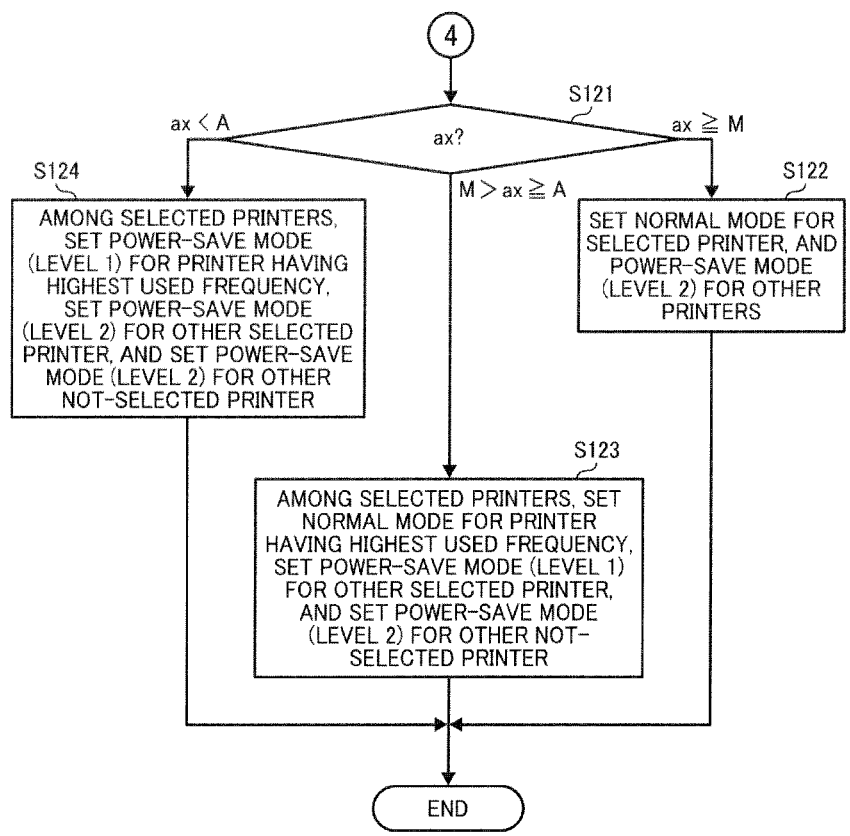
FIG. 6 shows a flowchart of power save control process for printers continued from FIG. 5.

Then, as shown in FIG. 6, the master printer compares the per-unit-time use-amount "ax" with the averaged printing performance M, and print speed A of the printer having the highest used frequency (step S121). The per-unit-time use-amount ax, averaged printing performance M, and print speed A can be expressed by using the same unit such as "number of sheets per minute" but not limited thereto.

Further, if the master printer identifies that another printer having the second highest priority order is present on the network NW, and such another printer having the second highest priority order has an enough level of remaining toner amount and remaining sheet numbers and can handle the averaged printing performance M (step S119: YES), the master printer checks current time using the internal clock circuit 24, and computes a per-unit-time use-amount ax for the current time zone, and sets the time updating routine process (FIG. 10) as effective (step S118). Then, the master printer compares the per-unit-time use-amount ax with the averaged printing performance M, and print speed A of printer having the highest used frequency (step S121) as shown in FIG. 6. As described as follows, the per-unit-time use-amount ax may be compared with the averaged printing performance M, and print speed A, for example, the comparing process may be conducted in cases such as "ax≥M," "M>ax≥A," and "ax<A."

If the master printer determines that the per-unit-time use-amount ax is the averaged printing performance M or more (ax≥M) for the current time zone at step S121, the master printer may set a normal mode for the selected printer and a power save mode for other remaining printers connected on the network NW, and then ends the power save control process (step S122). The normal mode is a normal power mode that uses power used for normal operation, which uses power greater than the power save mode. The power save mode may have different levels such as level 1 and level 2 as shown in FIG. 18, wherein the power-saving effect of level 2 is set greater than the power-saving effect of level 1.

Further, if the master printer determines that the per-unit-time use-amount ax is print speed A or more of the printer having the highest used frequency (M>ax≥A) for the current time zone at step S121, the master printer may set the normal mode for the printer having the highest used frequency selected from the printers Pr1 to Prm, and a power save mode (level 1) for other one or more of the selected printers, and a power save mode (level 2) for not-selected printers, and then ends the power save control process (step S123).

Further, if the master printer determines that the per-unit-time use-amount ax is less than the print speed A of the printer having the highest used frequency (ax<A) for the current time zone at step S121, the master printer may set the power save mode (level 1) for the printer having the highest used frequency, the power save mode (level 2) for other one or more of the selected printers, and the power save mode (level 2) for not-selected printers, and then ends the power save control process (step S124).

As shown in FIG. 18, each of the printers Pr1 to Prm can be controlled using different power modes such as the normal power mode, power save mode (level 1), and power save mode (level 2) depending on power consumption levels of printers. The normal power mode is a normal operation mode of on-line printer, which is not at the power save mode. The power save mode (level 1) is used to control a temperature of the fusing device, for example, 50% of a normal fusing temperature to reduce the power consumption. The power save mode (level 2) is used to entirely shutoff of the power supply to the engine 30 to reduce the power consumption of the printer engine as much as possible.

Figure 7:
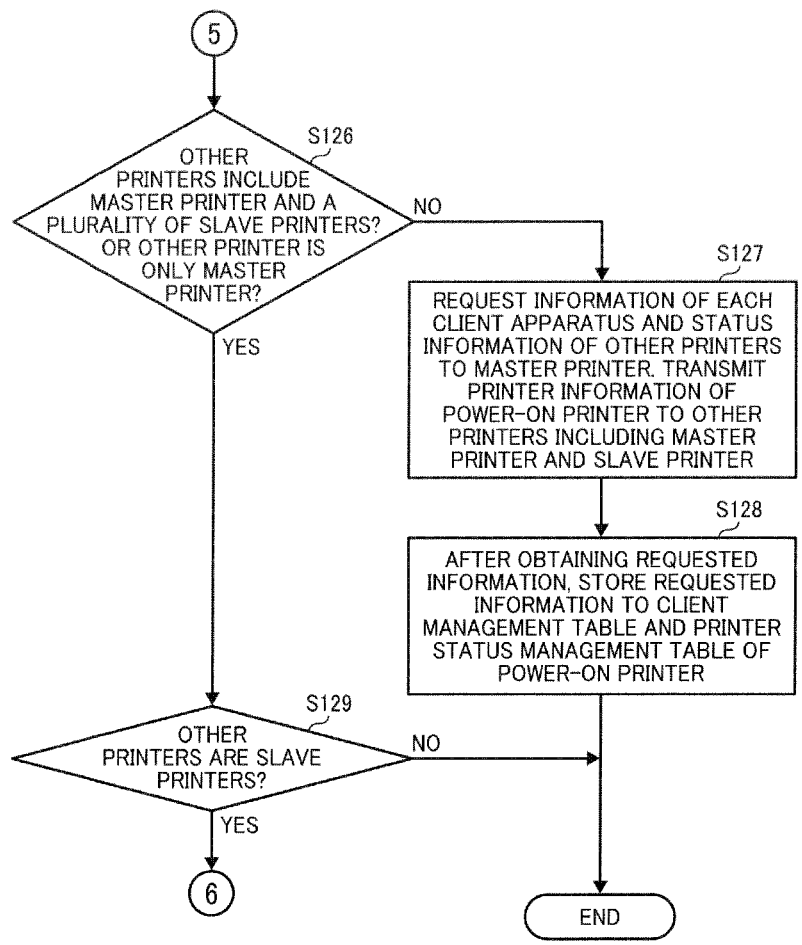
FIG. 7 shows a flowchart of power save control process for printers continued from FIG. 2.

Referring back to FIG. 2, the power-ON printer (S101) determines whether responses are received from other printers at step S103. If the power-ON printer receives the responses from other printers (step S103: YES) and the response-time counter 21a counts up the given time (step S125: YES), the power-ON printer checks whether a condition that other printers include a master printer and a plurality of slave printers or a condition that other printer include only a master printer is satisfied (step S126) as shown in FIG. 7. The number of slave printers among the printers Pr1 to Prm may become plural numbers during a determination or adjustment process of the master printer, or when a plurality of the printers are simultaneously set to power-ON and activated.

If the condition of that other printers include a master printer and a plurality of slave printers or the condition that other printer include only a master printer is not satisfied (step S126: NO), the power-ON printer requests information of each of the client apparatuses C1 to Cn and status information of all other printers to the master printer, and transmits printer information (color/monochrome type, print speed, applicable sheet size, remaining amount of consumables) of the power-ON printer to the master printer and slave printers (step S127). Upon obtaining the requested information, the power-ON printer stores the requested information to the client management table 25 and the printer status management table 26 of the power-ON printer, and ends the power save control process (step S128). As such, printer information of printers may be shared among the printers to conduct an effective and quick transfer of functionality of the master printer from one printer to other printer if the transfer of master printer is required.

As shown in FIG. 19, the printer status management table 26 stores printer information such as information of color/monochrome type, print speed, applicable sheet size, and remaining amount of consumables. Further, as shown in FIG. 20, the client management table 25 stores printer information such as the total number of client apparatuses C1 to Cn that are on-line, print history of client apparatuses C1 to Cn such as which client apparatus used which printers for printing, applications and sheets used for printing, the total number of printed pages, and currently used applications, but not limited these.

If the condition of that other printers include a master printer and a plurality of slave printers or the condition that other printer include only a master printer is satisfied (step S126: YES), the power-ON printer checks whether other printers include a plurality of slave printers (step S129). If other printers include only one slave printer (step S129: NO), it is determined that the power-saving effect in such a case is not so significant, and then the power-ON printer ends the power save control process.

Figure 8:
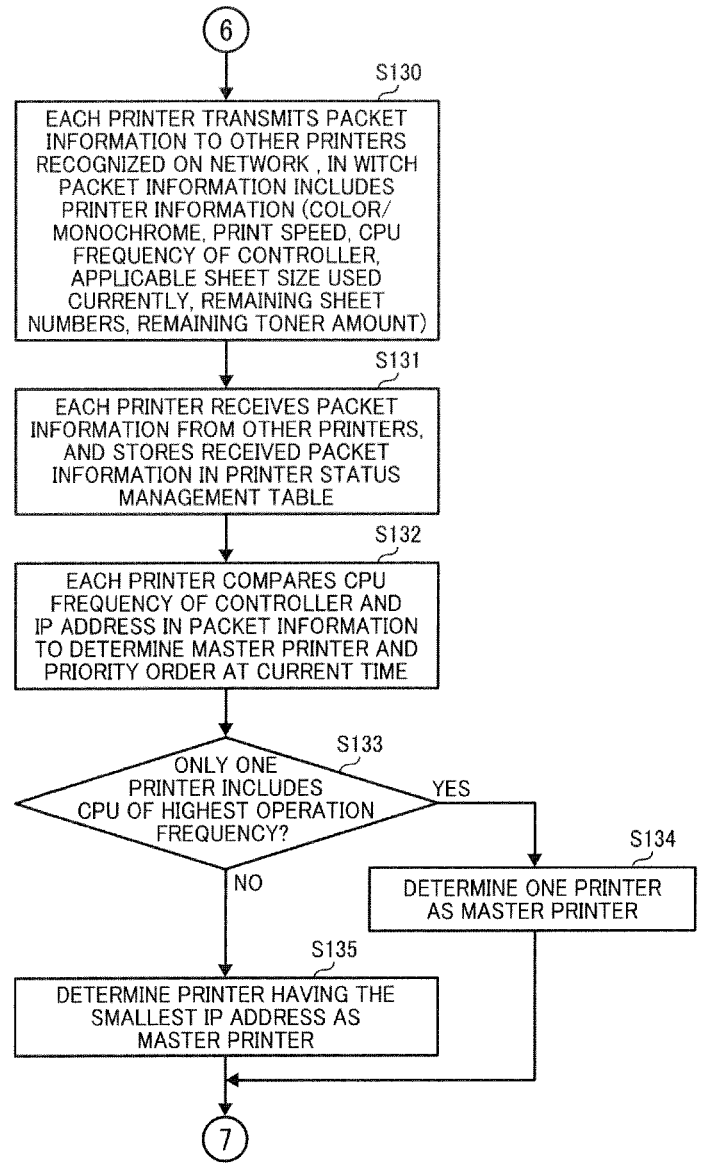
FIG. 8 shows a flowchart of power save control process for printers continued from FIG. 7.

If other printers include a plurality of slave printers (step S129: YES), as shown in FIG. 8, each of the power-ON printers transmits printer information (e.g., color/monochrome type, print speed, CPU operation frequency of the controller 20, applicable sheet size such as sheet currently stored in a sheet tray, remaining sheet numbers, remaining toner amount) of each of the printers to other printers recognized on the network NW as packet information (step S130). Hereinafter, the CPU operation frequency may be referred to as the CPU frequency. Each of the power ON printers stores the packet information received from other printers to the printer status management table 26 of each of the printers (step S131).

Each of the printers compare the CPU frequency of the controller 20 and the IP address included in the packet information to determine a master printer and a priority order at the current time (step S132), and checks whether only one printer has a CPU having the highest operation frequency (step S133).

If only one printer has the CPU having the highest operation frequency (step S133: YES), such printer is identified as a master printer among the printers Pr1 to Prm (step S134). If two or more printers use CPUs having the same highest operation frequency (step S133: NO), a printer having the smallest IP address among such two or more printers is identified as a master printer (step S135).

The printers Pr1 to Prm may identify a master printer based on the obtained information as follows.

1) A master printer is required to compute information of the network environment (e.g., operation environment, status information) configured with the plurality of printers Pr1 to Prm and the plurality of client apparatuses C1 to Cn changing along the time line. Therefore, the master printer requires a CPU having a faster computing speed, which means the primary condition to select the master printer is the computing speed or capacity of CPU. Therefore, the CPU frequency of the controller 20 is used as the primary condition to identify and select the master printer from the printers. If two or more printers use CPUs having the same highest operation frequency, a printer having the smallest IP address may be selected and used as a master printer.

2) The priority order used for selecting a master printer can be set in advance. For example, if printers X, Y, and Z are present on the network, the priority order can be set in the order of Y>X>Z (i.e., Y is master, X is second master, Z is third master). With such settings, when a power supply to the master Y is turned OFF, the functionality of master printer can be transferred to the printer X, which is the second master printer.

As such, the master printer and the priority order can be determined based on the CPU frequency of the controller 20 and the sequential order of IP addresses of printers. Therefore, the master printer can be identified uniquely from the plurality of printers.

The above described computing process by the master printer may be conducted for all of printers Pr1 to Prm concurrently. Such computing process for comparing the CPU frequency and IP address may not become a heavy workload for the controller 20 compared to the total workload for the controller 20.

Figure 9:
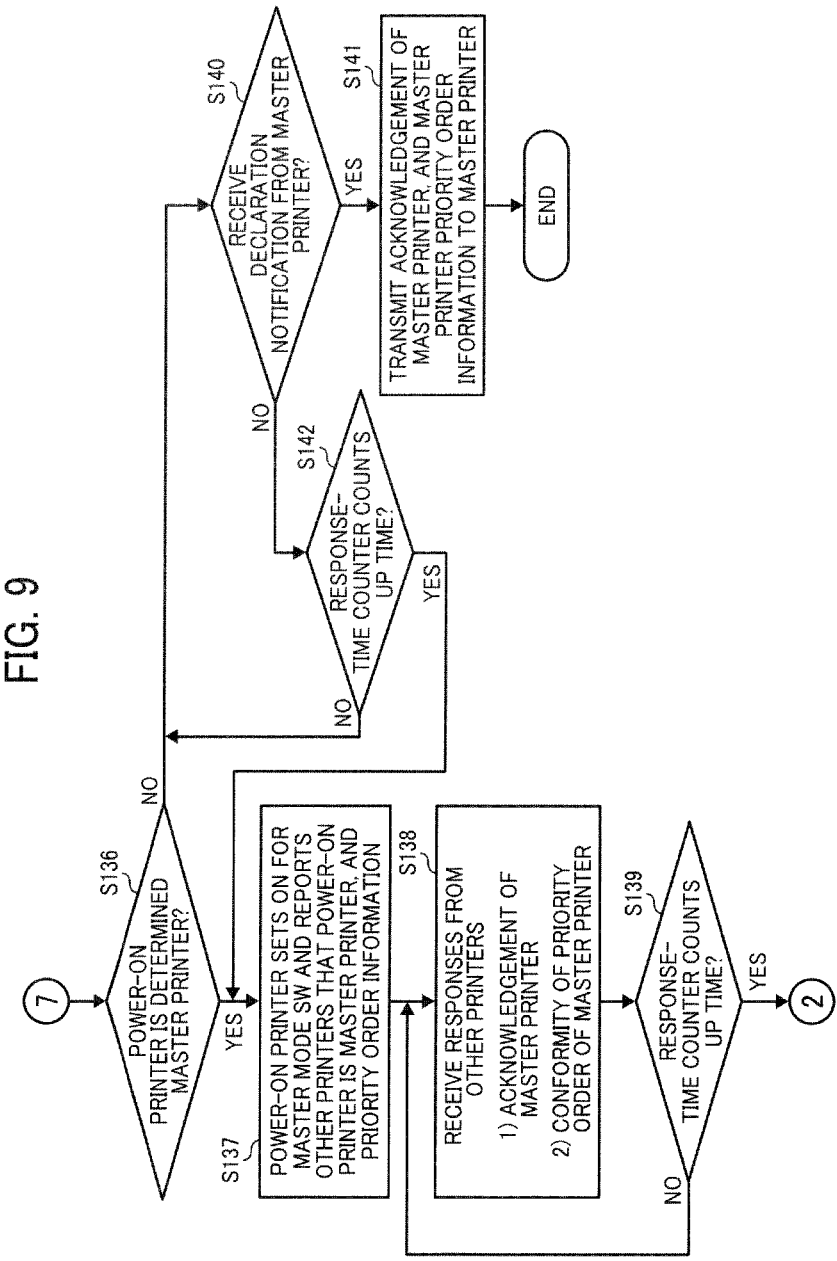
FIG. 9 shows a flowchart of power save control process for printers continued from FIG. 8.

Upon identifying the master printer, as shown in FIG. 9, the power-ON printer checks whether the power-ON printer is the identified master printer (step S136). If the power-ON printer is the master printer (step S136: YES), the power-ON printer sets its master mode SW 21b ON to set the power-ON printer as the master printer, and reports other printers that the power-ON printer is the master printer, and priority order information (step S137).

Then, the power-ON printer conducts a process of receiving a response, transmitted from each of other printers, such as acknowledgement of master printer and the conformity of priority order of master printer (step S138), and then checks whether the response-time counter 21a counts up a given time (step S139).

If the response-time counter 21a does not count up the given time (step S139: NO), the process returns to step S138, and the process of receiving response is repeatedly conducted (steps S138 and S139). If the response-time counter 21a counts up the given time (step S139: YES), the process shifts to step S106 (FIG. 3), and then steps S106 to S124 are conducted.

If the power-ON printer is not the identified master printer (step S136: NO), the power-ON printer checks whether a declaration notification is transmitted from the master printer (step S140). The declaration notification is transmitted from a printer, which becomes the master printer, to other printers.

If the declaration notification is not transmitted from the master printer (step S140: NO), the power-ON printer checks whether the response-time counter 21a counts up a given time (step S141). If the response-time counter 21a does not count up the given time (step S141: NO), the process returns to step S140, and the power-ON printer checks again whether a declaration notification is transmitted from the master printer (steps S140 and S141).

If the declaration notification is transmitted from the master printer within a given time (step S140: YES), the power-ON printer transmits the acknowledgement of master printer, and the priority order information of master printer to the master printer, and then ends the power save control process (step S142).

If the response-time counter 21a counts up the given time (step S141: YES) before the declaration notification is transmitted from the master printer, the process shifts to step S137. Then, the power-ON printer sets the master mode SW 21b ON to set the power-ON printer itself as the master printer, and reports other printers that the power-ON printer is the master, and priority order information, and conducts subsequent processes of step S137 to S139.

During the process of determining the master printer, when the power supply is turned OFF for a printer having the higher priority order compared to the power-ON printer, or the system malfunction occurs to a printer having the higher priority order compared to the power-ON printer, the power-ON printer determines that such other printer cannot respond, and declares that another printer having the next priority order may be used as the master printer.

Figure 10:
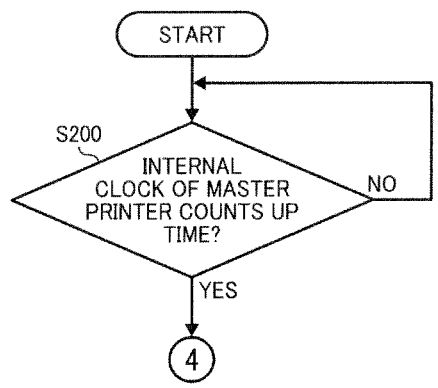
FIG. 10 shows a flowchart of process of time updating routine.

The time updating routine, which is set effective at step S118 (FIG. 5), conducts a confirmation process of the counting-up of the internal clock circuit 24 of the master printer (step S200) as shown in FIG. 10, and then the process returns to step S121 (FIG. 6).

Figure 11:
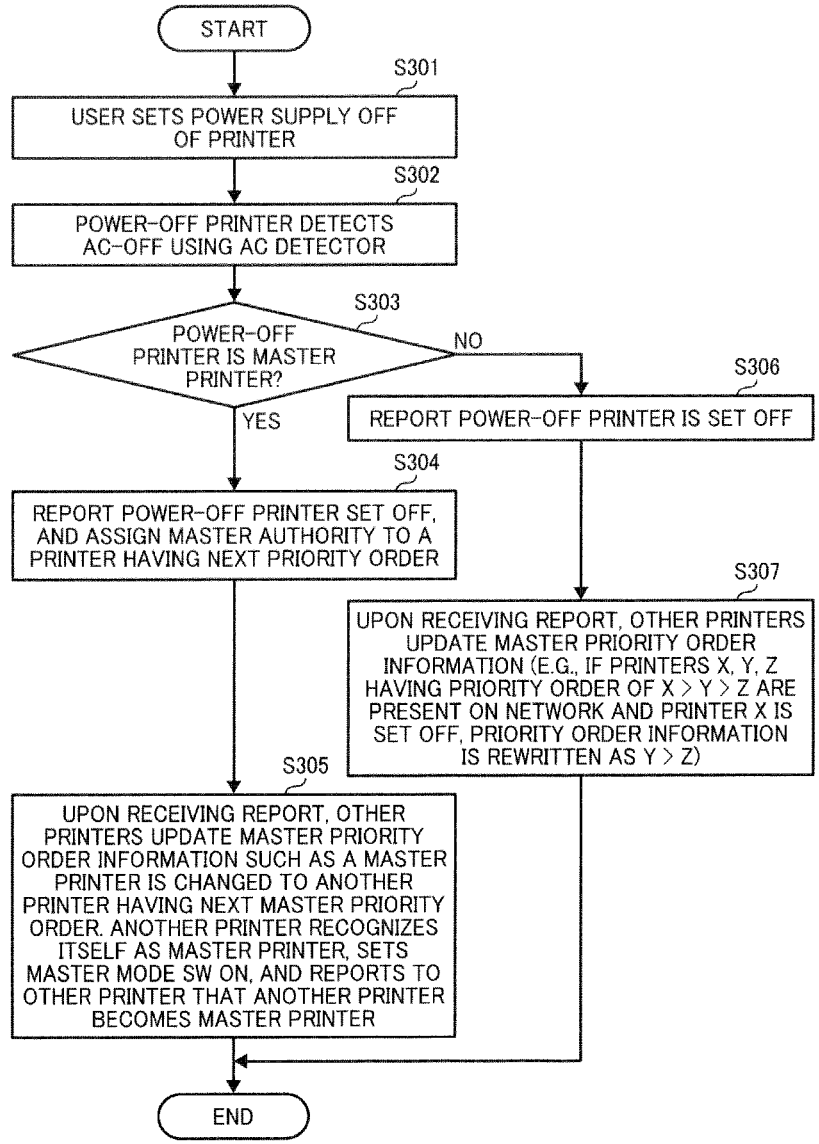
FIG. 11 shows a flowchart of power save control process of a printer when power supply is turned OFF.

Further, when the power supply is turned OFF for the printers Pr1 to Prm during the power save control process, the power save control process during the power supply OFF is conducted as shown in FIG. 11. Specifically, when a user sets power supply OFF for a printer (step S301), the AC level detector of the power-OFF printer detects AC-OFF of the power-OFF printer itself (step S302). Then, the power-OFF printer checks whether the power-OFF printer itself is used as a master printer (step S303).

If the power-OFF printer is identified as the master printer (step S303: YES), the power-OFF printer reports to other printers that the power-OFF printer is turned OFF, and reports to other printers a master authority assignment to assign a printer having the next master priority order as the master printer (step S304).

Upon receiving such report, other printers update priority order information for master printer. For example, other printers update information that a printer having the next priority order is to be used as the master printer. Further, the printer having the next priority order recognizes that the printer having the next priority order is to be used as the master printer, and sets the master mode SW 21b ON of the printer having the next priority order, and reports to other printers that the printer having the next priority order becomes the master printer, and ends the power save control process (step S305).

If the power-OFF printer is not the master printer (step S303: NO), the power-OFF printer reports other printers on the network NW that the power-OFF printer becomes OFF (step S306).

Upon receiving such report (step S306), other printers update the priority order information for master printer (step S307), and the power save control process ends. The priority order information for master printer can be updated as follows. For example, if printers X, Y, and Z are present on the network NW and the priority order is set in the order of X>Y>Z, when the printers X is turned OFF, the priority order information is updated to Y>Z.

Figure 12:
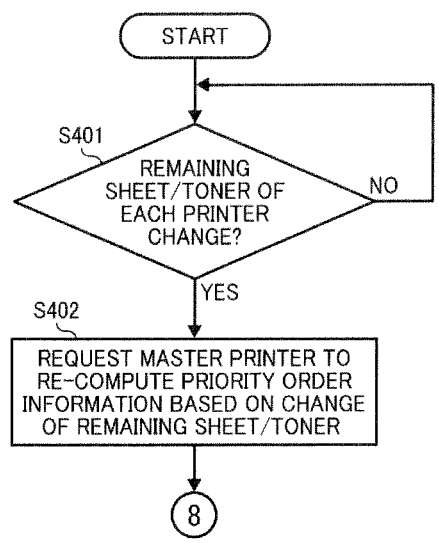
FIG. 12 shows a flowchart of power save control process of a printer when remaining sheet/toner are changed.

Further, when consumables such as remaining sheet numbers and remaining toner amount (hereinafter, remaining sheet/toner) of the printers, having set with a given priority order, changes, the power save control process is conducted as shown in FIG. 12. Specifically, each of the printers, having the given priority order, can be configured to detect the remaining sheet numbers and the remaining toner amount periodically with a given time interval, and determines whether a change occurs to such consumables. For example, each of the printers can determine that a change occurs to the consumables using a given criteria such as remaining sheet numbers in a sheet tray becomes 80% or less of the full sheet storage capacity (step S401).

If no changes occurs to the remaining sheet/toner (step S401: NO), each of the printers checks again whether a change occurs at a given later timing (step S401). If a change occurs to the remaining sheet/toner (step S401: YES), each of the printers requests the master printer to re-compute the priority order information based on the changed remaining sheet/toner (step S402), which is conducted from step S114 of FIG. 4 and thereafter in FIGS. 4 and 5.

Figure 13:
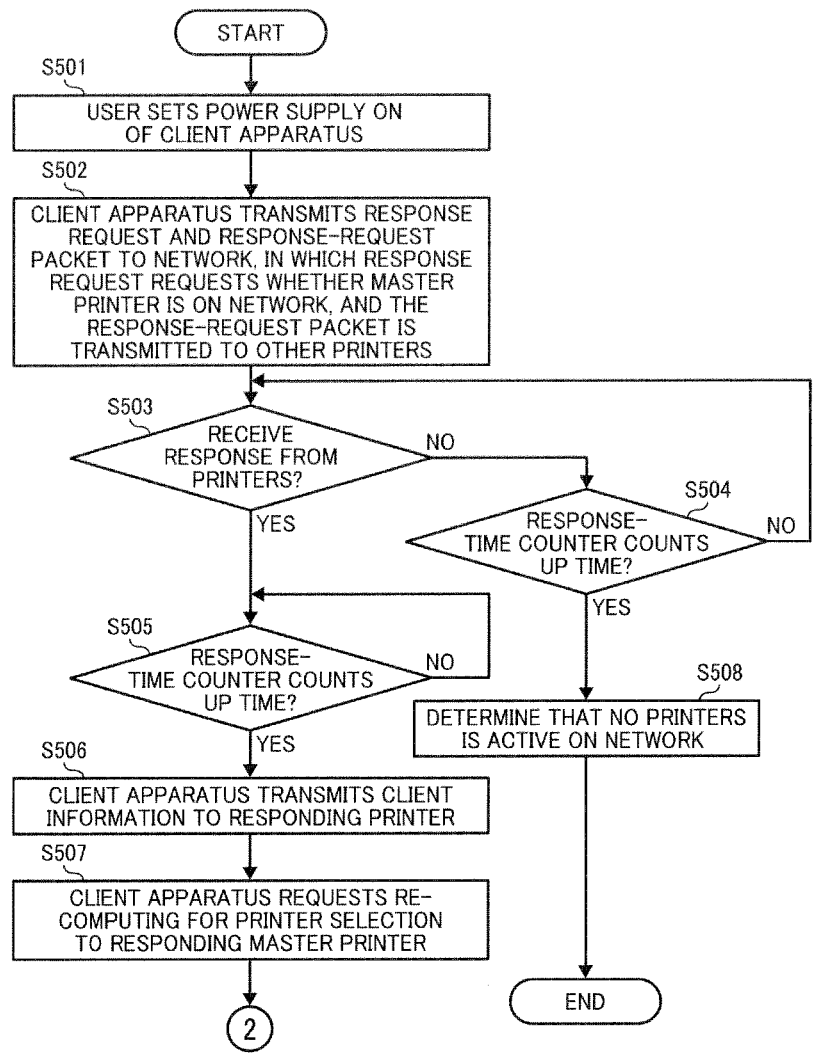
FIG. 13 shows a flowchart of power save control process of a client apparatus when power supply is turned OFF.

Further, the network printing system 1 conducts the power save control process when the client apparatuses C1 to Cn are set power ON as shown in FIG. 13.

As shown in FIG. 13, when a user sets power-ON for the client apparatuses C1 to Cn (step S501), each of the client apparatuses C to Cn transmits a response request and a response-request packet to the network NW, in which the response request requests whether a master printer is on the network NW, and the response-request packet is transmitted to printers to request a response from the printers (step S502). Then, it is confirmed whether a response is received from the printers on the network NW (step S503). If it is confirmed that no response is received (step S503: NO), it is checked whether the response-time counter 16 counts up a given time (step S504).

If the response-time counter 16 does not count up the given time (S504: NO), the power-ON client apparatuses C1 to Cn return to step S503, and the power-ON client apparatuses C1 to Cn repeatedly check whether a response from each of the printers is received with a given time interval (steps S503 and S504)

If the response from the printer is received (step S503: YES) and then the response-time counter 16 counts up the given time (step S505), the power-ON client apparatuses C1 to Cn transmit client information of the power-ON client apparatuses C1 to Cn to the printers that have issued the responses (step S506).

The power-ON client apparatuses C1 to Cn request a re-computing for printer selection to the master printer that has issued the response, and end the power save control process for the client apparatuses C1 to Cn (step S507).

Upon receiving the re-computing request, the master printer conducts the process of setting priority order shown in FIG. 4 and FIG. 5.

If no responses is transmitted from the printer (step S503: NO) and the response-time counter 16 counts up the given time (step S504: YES), the power-ON client apparatuses C1 to Cn determine that the network NW is not connected with an active or currently operating printer (step S508), and shifts to a stand-by mode, and ends the process. The stand-by mode can be shifted other mode upon receiving a packet request from the master printer when a given time elapses.

Figure 14:
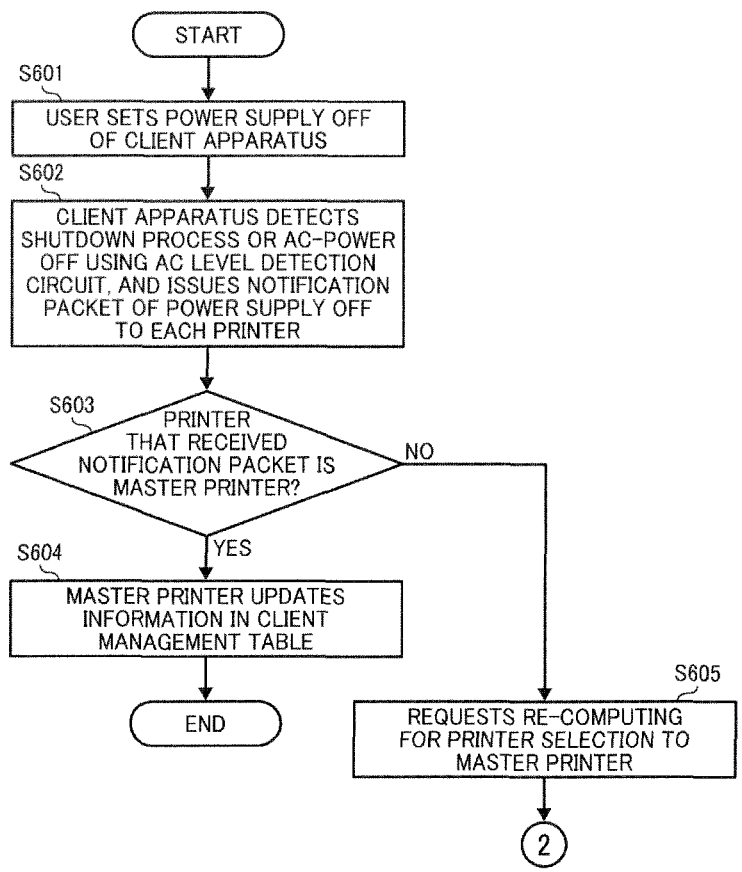

Further, as shown in FIG. 14, the network printing system 1 conducts the power save control process when the client apparatuses C1 to Cn are set power OFF.

As shown in FIG. 14, when a user sets power-OFF for the client apparatuses C1 to Cn (step S601), the client apparatuses C1 to Cn detect the AC power source OFF by a shutdown process or the AC level detection circuit 17, and issue a notification packet indicating power-OFF to each of the printers Pr1 to Prmn on the network NW (step S602).

Upon receiving the notification packet indicating power-OFF from the client apparatuses C1 to Cn, at each of the printers Pr1 to Prm, it is checked whether the printer that receives the notification packet is a master printer (step S603).

If the printer that receives the notification packet is the master printer (step S603: YES), the master printer updates information in the client management table 25 of the master printer (step S604), and ends the power save control process. If the printer that receives the notification packet is not the master printer (step S603: NO), such one printer requests the re-computing of printer selection to the master printer (step S605).

In the above-described network printing system 1, a plurality of image forming apparatuses is connectable to a plurality of host apparatuses via a network. The plurality of host apparatuses is capable of generating print data and requesting a print request of the print data to at least one of the plurality of image forming apparatuses. The image forming apparatus is capable of printing an image based on the print data and the print request received from at least one of the host apparatuses on a recording medium, and the image forming apparatus has a power save mode to reduce power consumption. The image forming apparatus includes an apparatus information collection unit 21 to obtain print history and function information as apparatus information of each of the image forming apparatuses disposed on the network and stores the apparatus information in an apparatus information storing unit 26; a priority order determination unit 22 to determine a priority order for setting a master image forming apparatus that controls the power save mode of each of the image forming apparatuses currently in operation based on the apparatus information stored in the apparatus information storing unit 26; a master determination unit 22 to determine an image forming apparatus having the highest priority order among the currently operating image forming apparatuses disposed on the network as the master image forming apparatus; a host information collection unit 21 to collect print history and current print settings as host information of at least one power-ON host apparatus disposed on the network and to store the host information to a host information storage unit; a required-printing-capacity computing unit 22 to compute required network printing capacity based on the host information stored in the host information storage unit; and a power save control unit to control the power save mode of each of the image forming apparatuses disposed on the network based on the priority order, the apparatus information of the image forming apparatus corresponding to the priority order, and the required printing capacity, wherein the power save control unit of the master image forming apparatus, identified by the master determination unit, controls the power save mode of each of the image forming apparatuses disposed on the network.

Therefore, based on information of the averaged printing performance M of client apparatuses C1 to Cn, which are currently power-ON, and apparatus information on the printers Pr1 to Prm disposed on the network NW, the power save mode of the printers Pr1 to Prm can be controlled, and the power-saving effect of the entire network printing system 1 configured with the plurality of printers Pr1 to Prm and the plurality of the client apparatuses C1 to Cn can be enhanced.

Further, in the above-described network printing system 1, a plurality of host apparatuses generate print data and request a print request of the print data; and a plurality of image forming apparatuses is connectable with the plurality of host apparatuses via a network. The plurality of image forming apparatuses is capable of printing an image based on the print data and the print request received from at least one of the host apparatuses on a recording medium, and the image forming apparatus has a power save mode to reduce power consumption. Each of the host apparatuses includes a host information management unit to obtain print history and current print settings as host information, and to provide the host information upon receiving a request of the host information from the image forming apparatus. Each of image forming apparatuses includes an apparatus information collection unit 21 to obtain print history and function information as apparatus information of each of the image forming apparatuses disposed on the network and stores the apparatus information in an apparatus information storing unit 26; a priority order determination unit 22 to determine a priority order for setting a master image forming apparatus that controls the power save mode of each of the image forming apparatuses currently in operation based on the apparatus information stored in the apparatus information storing unit 26; a master determination unit 22 to determine an image forming apparatus having the highest priority order among the currently operating image forming apparatuses disposed on the network as the master image forming apparatus; a host information collection unit 21 to collect print history and current print settings as host information of at least one power-ON host apparatus disposed on the network and to store the host information to a host information storage unit; a required-printing-capacity computing unit 22 to compute required network printing capacity based on the host information stored in the host information storage unit; and a power save control unit 22 to control the power save mode of each of the image forming apparatuses disposed on the network based on the priority order, the apparatus information of the image forming apparatus corresponding to the priority order, and the required printing capacity, wherein the power save control unit of the master image forming apparatus, identified by the master determination unit, controls the power save mode of each of the image forming apparatuses disposed on the network.

Therefore, based on information of the averaged printing performance M of client apparatuses C1 to Cn, which are currently power-ON, and apparatus information on the printers Pr1 to Prm disposed on the network NW, the power save mode of the printers Pr1 to Prm can be controlled, and the power-saving effect of the entire network printing system 1 configured with the plurality of printers Pr1 to Prm and the plurality of the client apparatuses C1 to Cn can be enhanced.

Further, in the above-described network printing system 1, a method of power save control for a network printing system configured with a plurality of image forming apparatuses and a plurality of host apparatuses connectable with each other via a network is devised. The plurality of host apparatuses is capable of generating print data and requesting a print request of the print data to at least one of the plurality of image forming apparatuses. The plurality of image forming apparatus is capable of printing an image based on the print data and the print request received from at least one of the host apparatuses on a recording medium, and the plurality of image forming apparatus has a power save mode to reduce power consumption. The method includes the steps of 1) obtaining print history and function information as apparatus information of each of the image forming apparatuses disposed on the network and storing the apparatus information in an apparatus information storing unit; 2) determining a priority order for setting a master image forming apparatus that controls the power save mode of each of the image forming apparatuses currently in operation based on the apparatus information stored in the apparatus information storing unit; 3) identifying an image forming apparatus having the highest priority order among the currently operating image forming apparatuses disposed on the network as the master image forming apparatus; 4) collecting print history and current print settings as host information of at least one power-ON host apparatus disposed on the network and storing the host information to a host information storage unit; 5) computing required network printing capacity based on the host information stored in the host information storage unit; 6) controlling the power save mode of each of the image forming apparatuses disposed on the network based on the priority order, the apparatus information of the image forming apparatus corresponding to the priority order, and the required printing capacity; and 7) controlling the power save mode of each of the image forming apparatuses disposed on the network using the power save controlling by the identified master image forming apparatus.

Therefore, based on information of the averaged printing performance M of client apparatuses C1 to Cn, which are currently power-ON, and apparatus information on the printers Pr1 to Prm disposed on the network NW, the power save mode of the printers Pr1 to Prm can be controlled, and the power-saving effect of the entire network printing system 1 configured with the plurality of printers Pr1 to Prm and the plurality of the client apparatuses C1 to Cn can be enhanced.

Further, in the above-described network printing system 1, a non-transitory computer-readable storage medium stores a program that, when executed by a computer, causes the computer to execute a method of power save control for a network printing system configured with a plurality of image forming apparatuses and a plurality of host apparatuses connectable with each other via a network. The plurality of host apparatuses is capable of generating print data and requesting a print request of the print data to at least one of the plurality of image forming apparatuses. The plurality of image forming apparatus is capable of printing an image based on the print data and the print request received from at least one of the host apparatuses on a recording medium, and the plurality of image forming apparatuses has a power save mode to reduce power consumption. The method includes the steps of 1) obtaining print history and function information as apparatus information of each of the image forming apparatuses disposed on the network and storing the apparatus information in an apparatus information storing unit; 2) determining a priority order for setting a master image forming apparatus that controls the power save mode of each of the image forming apparatuses currently in operation based on the apparatus information stored in the apparatus information storing unit; 3) identifying an image forming apparatus having the highest priority order among the currently operating image forming apparatuses disposed on the network as the master image forming apparatus; 4) collecting print history and current print settings as host information of at least one power-ON host apparatus disposed on the network and storing the host information to a host information storage unit; 5) computing required network printing capacity based on the host information stored in the host information storage unit; 6) controlling the power save mode of each of the image forming apparatuses disposed on the network based on the priority order, the apparatus information of the image forming apparatus corresponding to the priority order, and the required printing capacity; and 7) controlling the power save mode of each of the image forming apparatuses disposed on the network using the power save controlling by the identified master image forming apparatus.

Therefore, based on information of the averaged printing performance M of client apparatuses C1 to Cn, which are currently power-ON, and apparatus information on the printers Pr1 to Prm disposed on the network NW, the power save mode of the printers Pr1 to Prm can be controlled, and the power-saving effect of the entire network printing system 1 configured with the plurality of printers Pr1 to Prm and the plurality of the client apparatuses C1 to Cn can be enhanced.

Further, in the above-described network printing system 1, the power save mode control unit 22 of the master printer sets the normal mode or normal operation mode for one or more of the printers selected from the printers Pr1 to Prm having the higher priority order so that the number of printers becomes sufficient to handle the averaged printing performance M, and shifts other printers to the power save mode.

Therefore, based on information of the averaged printing performance M of client apparatuses C1 to Cn, which are currently power-ON, and apparatus information on the printers Pr1 to Prm disposed on the network NW, some of the printers can be controlled to the normal mode, and other printers can be controlled to the power save mode, and the power-saving effect of the entire network printing system 1 configured with the plurality of printers Pr1 to Prm and the plurality of the client apparatuses C1 to Cn can be enhanced.

Further, in the above-described network printing system 1, when the power supply is turned OFF for the master printer, the power save mode control unit 22, used as the master determination unit, determines another active or currently operating printer having the second or next highest priority order, which is after the master printer of the highest priority order, as a new master printer, and the power save mode control unit 22 of the new master printer controls the power save mode for active or currently operating printers on the network NW.

Therefore, even if the power supply is turned OFF for the master printer, the next master printer can be identified, by which the power-saving for the network printing system 1 can be conducted effectively, and the power-saving effect of the entire network printing system 1 configured with the plurality of printers Pr1 to Pnn and the plurality of the client apparatuses C1 to Cn can be further enhanced.

Further, in the above-described network printing system 1, when the power supply for the printers Pr1 to Prm operated under the normal mode is turned OFF, the power save mode control unit 22 of the master printer shifts one or more of the printers from the power save mode to the normal mode so that averaged printing performance M can be handled. For example, one group composed of printers A, B, C, D, E, F and G is connected to the network, and the printers A, C, E, F and G can handle the average printing performance M. Further, in such one group, the performance order of the printers A, C, E, F and G are set in the order of C, E, A, G, F, which means the printer C has the highest performance order. In such printers, three printers C, E, A are selected and used under the normal mode, and other printers G, F are set to the power save mode. When the printers C, E, A are being used under the normal mode, one of them (e.g., printer E) may be turned OFF. In such a case, the printer G having a priority order next to the power-OFF printer E is shifted from the power save mode to the normal mode.

As such, each one of the plurality of image forming apparatuses can be ranked with a priority order from highest to lowest in the network printing system 1. As for the plurality of image forming apparatuses disposed in the network printing system 1, image forming apparatuses, operating in the normal operation mode, includes an image forming apparatus having the lowest priority among the operated image forming apparatuses, and other image forming apparatuses, operating in the power save mode, includes an image forming apparatus having the next lowest priority compared with the image forming apparatus having the lowest priority among the operated image forming apparatuses. If power supply to at least one of the image forming apparatuses operating in the normal operation mode is turned OFF, the power save control unit of the master image forming apparatus shifts the image forming apparatus having the next lowest priority from the power save mode to the normal operation mode.

Therefore, in the network printing system 1, even if the power supply to the printers Pr1 to Prm operated under the normal mode is turned OFF, one or more of printers that can handle the averaged printing performance M can be returned to the normal mode, by which the power-saving effect of the network printing system 1 can be enhanced while enhancing user operability.

Further, in the above-described network printing system 1, when the power supply for the client apparatuses C1 to Cn on the network NW is turned ON or OFF (ON/OFF), the packet communication control unit 21, used as the host information collection unit, updates host information of the ON/OFF client apparatuses C1 to Cn, and stores the update host information in the client management table 25, and the power save mode control unit 22, used as the required-printing-capacity computing unit, computes the averaged printing performance M based on the updated host information.

Therefore, in the network printing system 1, even if the power supply to the client apparatuses C1 to Cn, which use the printers Pr1 to Prm, is turned ON or OFF (ON/OFF), the host information can be updated based on the ON/OFF of the client apparatuses C1 to Cn, and then the power save mode can be controlled. Therefore, the power-saving effect of the entire network printing system 1 configured with the plurality of printers Pr1 to Prm and the plurality of the client apparatuses C1 to Cn can be further enhanced.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as Cr++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software combination. In example embodiment, processing units, computing units, or controllers can be configured with using various types of processors, circuits, or the like such as a programmed processor, a circuit, an application specific integrated circuit (ASIC), used singly or in combination.

In the above described example embodiment, the power-saving effect of a network printing system configured with a plurality of image forming apparatuses and a plurality of host apparatuses can be enhanced.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image forming apparatus, which is one of a plurality of image forming apparatuses connectable to a plurality of host apparatuses via a network, the plurality of host apparatuses capable of generating print data and requesting a print request of the print data to at least one of the plurality of image forming apparatuses, the image forming apparatus capable of printing an image based on the print data and the print request received from at least one of the host apparatuses on a recording medium, and the image forming apparatus having a power save mode to reduce power consumption, the image forming apparatus comprising:

an apparatus information collection unit to obtain print history and function information of each of the image forming apparatuses disposed on the network;

an apparatus information storing unit to store the print history and function information collected by the apparatus information collection unit as apparatus information;

a priority order determination unit to determine a priority order for setting a master image forming apparatus that controls the power save mode of each of the image forming apparatuses currently in operation based on the apparatus information stored in the apparatus information storing unit;

a master determination unit to identify an image forming apparatus having the highest priority order among the currently operating image forming apparatuses disposed on the network as the master image forming apparatus;

a host information collection unit to collect print history and current print settings for at least one power-ON host apparatus disposed on the network;

a host information storage unit to store the print history and current print settings collected by the host information collection unit as host information;

a required-printing-capacity computing unit to compute required network printing capacity based on the host information stored in the host information storage unit; and a power save control unit to control the power save mode of each of the image forming apparatuses disposed on the network based on the priority order, the apparatus information of the image forming apparatus corresponding to the priority order, and the required network printing capacity, the power save control unit of the master image forming apparatus, identified by the master determination unit and configured to print an image based on print data, controlling the power save mode of all of the image forming apparatuses disposed on the network.

2. The image forming apparatus of claim 1, wherein the plurality of image forming apparatuses are ranked in priority order from highest to lowest, wherein the power save control unit of the master image forming apparatus sets a normal operation mode for one or more of the image forming apparatuses selected from image forming apparatuses having a higher priority order and sufficient to handle the required network printing capacity, wherein the power save control unit shifts image forming apparatuses not selected to the power save mode.

3. The image forming apparatus of claim 1, wherein when power supply to the master image forming apparatus is turned OFF, the master determination unit of the master image forming apparatus identifies another currently operating image forming apparatus having the next highest priority as the master image forming apparatus, wherein the power save control unit of the newly identified master image forming apparatus controls the power save mode of the currently operating image forming apparatus.

4. The image forming apparatus of claim 2, wherein the plurality of image forming apparatuses includes image forming apparatuses, operating in the normal operation mode, including an image forming apparatus having the lowest priority among the operated image forming apparatuses, and image forming apparatuses, operating in the power save mode, including an image forming apparatus having the next lowest priority compared with the image forming apparatus having the lowest priority among the operated image forming apparatuses, wherein when power supply to at least one of the image forming apparatuses operating in the normal operation mode is turned OFF, the power save control unit of the master image forming apparatus shifts the image forming apparatus having the next lowest priority from the power save mode to the normal operation mode.

5. The image forming apparatus of claim 1, wherein when power supply to the host apparatuses disposed on the network is turned ON or OFF, the host information collection unit updates the host information of the ON or OFF host apparatuses and stores the updated host information in the host information storage unit, wherein the required-printing-capacity computing unit computes the required network printing capacity based on the updated host information.

6. A network printing system, comprising:

the plurality of image forming apparatuses of claim 1; and a plurality of host apparatuses to generate print data and request a print request of the print data, connectable with the plurality of image forming apparatuses via a network, the plurality of image forming apparatuses capable of printing an image based on the print data and the print request received from at least one of the host apparatuses on a recording medium, and the image forming apparatus, each of the host apparatuses including a host information management unit to obtain print history and current print settings as host information and to provide the host information upon receiving a request of the host information from the image forming apparatus.

7. A power save control method for a network printing system configured with a plurality of image forming apparatuses and a plurality of host apparatuses connectable with each other via a network, the plurality of host apparatuses capable of generating print data and requesting a print request of the print data to at least one of the plurality of image forming apparatuses, the image forming apparatus capable of printing an image based on the print data and the print request received from at least one of the host apparatuses on a recording medium, and the image forming apparatus having a power save mode to reduce power consumption, the method comprising the steps of:

(a) obtaining print history and function information for each of the image forming apparatuses disposed on the network and storing the print history and function information as apparatus information in an apparatus information storing unit;

(b) determining a priority order for setting a master image forming apparatus that controls the power save mode of each of the image forming apparatuses currently in operation based on the apparatus information stored in the apparatus information storing unit;

(c) identifying an image forming apparatus having the highest priority order among the currently operating image forming apparatuses disposed on the network as the master image forming apparatus;

(d) collecting print history and current print settings for at least one power-ON host apparatus disposed on the network and storing the print history and current print settings as host information to a host information storage unit;

(e) computing required network printing capacity based on the host information stored in the host information storage unit;

(f) controlling the power save mode of each of the image forming apparatuses disposed on the network based on the priority order, the apparatus information of the image forming apparatus corresponding to the priority order, and the required network printing capacity; and (g) controlling the power save mode of all of the image forming apparatuses disposed on the network using the power save control by the master image forming apparatus identified in (c) and configured to print an image based on print data.

8. A non-transitory computer-readable storage medium storing a program that, when executed by a computer, causes the computer to execute a method of power save control for a network printing system configured with a plurality of image forming apparatuses and a plurality of host apparatuses connectable with each other via a network, the plurality of host apparatuses capable of generating print data and requesting a print request of the print data to at least one of the plurality of image forming apparatuses, the image forming apparatus capable of printing an image based on the print data and the print request received from at least one of the host apparatuses on a recording medium, and the image forming apparatus having a power save mode to reduce power consumption, the method comprising the steps of:

(a) obtaining print history and function information for each of the image forming apparatuses disposed on the network and storing the print history and function information as apparatus information in an apparatus information storing unit;

(b) determining a priority order for setting a master image forming apparatus that controls the power save mode of each of the image forming apparatuses currently in operation based on the apparatus information stored in the apparatus information storing unit;

(c) identifying an image forming apparatus having the highest priority order among the currently operating image forming apparatuses disposed on the network as the master image forming apparatus;

(d) collecting print history and current print settings for at least one power-ON host apparatus disposed on the network and storing the print history and current print settings as host information to a host information storage unit;

(e) computing required network printing capacity based on the host information stored in the host information storage unit;

(f) controlling the power save mode of each of the image forming apparatuses disposed on the network based on the priority order, the apparatus information of the image forming apparatus corresponding to the priority order, and the required network printing capacity; and (g) controlling the power save mode of all of the image forming apparatuses disposed on the network using the power save control by the master image forming apparatus identified in (c) and configured to print an image based on print data.

9. The image forming apparatus of claim 1, wherein the master image forming apparatus comprises an engine to print an image based on print data.

* * * * *